(12) United States Patent
Zheng et al.

(10) Patent No.: US 11,632,441 B2
(45) Date of Patent: Apr. 18, 2023

(54) METHODS, SYSTEMS, AND DEVICES FOR ELECTRONIC NOTE IDENTIFIER ALLOCATION AND ELECTRONIC NOTE GENERATION

(71) Applicant: Tencent Technology (Shenzhen) Company Limited, Shenzhen (CN)

(72) Inventors: Luohai Zheng, Shenzhen (CN); Jiguang Lu, Shenzhen (CN); Wangsheng Zhou, Shenzhen (CN); Jianjun Zhang, Shenzhen (CN); Junjie Shi, Shenzhen (CN); Hujia Chen, Shenzhen (CN); Jun Zang, Shenzhen (CN); Chuanbing Dai, Shenzhen (CN); Qing Qin, Shenzhen (CN); Yige Cai, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 210 days.

(21) Appl. No.: 17/200,594

(22) Filed: Mar. 12, 2021

(65) Prior Publication Data
US 2021/0203751 A1 Jul. 1, 2021

Related U.S. Application Data

(63) Continuation of application No. PCT/CN2020/075845, filed on Feb. 19, 2020.

(30) Foreign Application Priority Data

Mar. 6, 2019 (CN) .......................... 201910168483.9

(51) Int. Cl.
*G06Q 20/04* (2012.01)
*H04L 67/63* (2022.01)
(Continued)

(52) U.S. Cl.
CPC ........... *H04L 67/63* (2022.05); *G06Q 10/067* (2013.01); *G06Q 30/04* (2013.01); *H04L 67/133* (2022.05);
(Continued)

(58) Field of Classification Search
CPC ..... H04L 67/63; H04L 67/133; H04L 67/562; G06Q 10/067; G06Q 30/04; G06Q 20/0425
See application file for complete search history.

(56) References Cited

U.S. PATENT DOCUMENTS 6,304,857 B1 * 10/2001 Heindel ................. G06Q 30/04
705/34
11,475,447 B2 * 10/2022 Main .................... G06Q 20/401
(Continued)

FOREIGN PATENT DOCUMENTS

CN 104219321 A 12/2014
CN 104851031 A 8/2015
(Continued)

OTHER PUBLICATIONS

Anonymous, "Data Synchronization—Wikipedia", Feb. 22, 2019, XP055873345, 4 pgs., Retrieved from the Internet: https://en.wikipedia.org/w/index.php?title=Data_synchronization&direction=prev&oldid=887080147.
(Continued)

*Primary Examiner* — Chris Parry
*Assistant Examiner* — Hassan A Khan
(74) *Attorney, Agent, or Firm* — Morgan, Lewis & Bockius LLP

(57) ABSTRACT

Embodiments of this application disclose methods, systems, and devices for electronic note identifier allocation and electronic note generation. In one aspect, an electronic note identifier allocation method is performed by a processing
(Continued)

node of a distributed computer system. The processing node receives an electronic note identifier application request initiated by a service node. The processing node generates an electronic note identifier set in response to the electronic note identifier application request. The processing node also synchronizes the electronic note identifier in the electronic note identifier set. After the synchronizing, the processing node further the electronic note identifier in the electronic note identifier set to the service node.

14 Claims, 13 Drawing Sheets

(51) Int. Cl.
*G06Q 10/067* (2023.01)
*G06Q 30/04* (2012.01)
*H04L 67/133* (2022.01)
*H04L 67/562* (2022.01)

(52) U.S. Cl.
CPC ....... *H04L 67/562* (2022.05); *G06Q 20/0425* (2013.01)

(56) References Cited

U.S. PATENT DOCUMENTS

| | | | |
|---|---|---|---|
| 2003/0110128 A1* | 6/2003 | Foth | G06Q 30/04 705/40 |
| 2015/0294380 A1* | 10/2015 | Kikuchi | G06Q 30/04 705/34 |
| 2016/0330034 A1* | 11/2016 | Back | G06Q 20/065 |
| 2017/0161730 A1* | 6/2017 | Hattar | G07F 19/203 |
| 2017/0277556 A1* | 9/2017 | Ishii | G06F 9/45558 |
| 2018/0285864 A1* | 10/2018 | Dill | G06Q 20/40 |
| 2019/0080392 A1* | 3/2019 | Youb | G06F 21/64 |
| 2019/0244186 A1* | 8/2019 | Guo | G06Q 20/3825 |
| 2019/0259024 A1* | 8/2019 | Zhang | H04L 9/50 |
| 2020/0118094 A1* | 4/2020 | Haldenby | G06Q 10/0631 |
| 2020/0127813 A1* | 4/2020 | Millar | G06Q 20/363 |
| 2021/0234703 A1* | 7/2021 | Li | G06F 16/22 |
| 2021/0272101 A1* | 9/2021 | Kalgi | G06Q 20/325 |
| 2022/0172179 A1* | 6/2022 | Bricca | G06Q 20/20 |

FOREIGN PATENT DOCUMENTS

| | | |
|---|---|---|
| CN | 105096172 A | 11/2015 |
| CN | 105608165 A | 5/2016 |
| CN | 106934673 A | 7/2017 |
| CN | 106952094 A | 7/2017 |
| CN | 107862615 A | 3/2018 |
| CN | 109949111 A | 6/2019 |
| JP | 2003256651 A | 9/2003 |
| WO | WO 2016067424 A1 | 5/2016 |

OTHER PUBLICATIONS

Anonymous, "Load Balancing (Computing)—Wikipedia", Feb. 8, 2019, XP055873426, 9 pgs., Retrieved from the Internet: https://en.wikipedia.org/w/index.php?title=Load_balancing (computing) &oldid=882401945.
Extended European Search Report, EP20767121.5, dated Jan. 19, 2022, 11 pgs.
Tencent Technology, ISR, PCT/CN2020/075845, May 20, 2020, 3 pgs.
Tencent Technology, WO, PCT/CN2020/075845, May 20, 2020, 5 pgs.
Tencent Technology, IPRP, PCT/CN2020/075 845, dated Aug. 25, 2021, 6 pgs.

* cited by examiner (a)

(b)

VAT Electronic General Invoice

Invoice title     User A

Invoice amount     100.00

Invoicing unit     Merchant B

Invoicing time     2018-12-09

Invoice code     14403180911

Invoice number     000000001

FIG. 15

METHODS, SYSTEMS, AND DEVICES FOR ELECTRONIC NOTE IDENTIFIER ALLOCATION AND ELECTRONIC NOTE GENERATION

CROSS REFERENCE TO RELATED APPLICATIONS

This application is a continuation application of PCT Patent Application No. PCT/CN2020/075845, entitled "ELECTRONIC INVOICE IDENTIFIER ALLOCATION METHOD, AND ELECTRONIC TICKET GENERATING METHOD, DEVICE AND SYSTEM" filed on Feb. 19, 2020, which claims priority to Chinese Patent Application No. 201910168483.9, filed with the State Intellectual Property Office of the People's Republic of China on Mar. 6, 2019 and entitled "ELECTRONIC NOTE IDENTIFIER ALLOCATION METHOD AND APPARATUS, AND ELECTRONIC NOTE GENERATION METHOD, APPARATUS, AND SYSTEM", all of which are incorporated herein by reference in their entireties.

FIELD OF THE TECHNOLOGY

This application relates to the field of distributed system technologies, and in particular, to electronic note identifier allocation and electronic note (e.g., electronic invoice, electronic receipt etc.) generation.

BACKGROUND OF THE DISCLOSURE

With the development of Internet technologies, increasingly more merchants tend to apply for electronic note identifiers on the Internet. If electronic note identifier application requests of the merchants are processed sequentially by using a single machine, it is difficult to respond to massive concurrent electronic note identifier application requests, and allocation efficiency of electronic note identifiers is affected. Therefore, a distributed system-based electronic note identifier allocation method is provided, to respond to massive concurrent electronic note identifier application requests.

The distributed system includes a plurality of processing nodes configured to allocate electronic note identifiers. To ensure data consistency between the processing nodes, the electronic note identifiers allocated by the processing nodes are unique, so that the electronic notes are uniquely identified by using the electronic note identifiers.

SUMMARY

To resolve a problem in the related art of relatively poor universality of electronic note identifiers allocated based on a distributed system, embodiments of this application provide an electronic note identifier allocation method and apparatus, an electronic note generation method, apparatus, and system, a computer device, and a storage medium.

The technical solutions used in this application are as follows:

According to an aspect of the embodiments of this application, an electronic note identifier allocation method is performed by a processing node of a computer distributed system. The distributed computer system includes a plurality of processing nodes, one or more processors, and memory storing instructions for execution by the one or more processors, the method comprising:

receiving, by the processing node, an electronic note identifier application request initiated by a service node;

generating an electronic note identifier set in response to the electronic note identifier application request, the electronic note identifier set including at least one electronic note identifier, and the electronic note identifier including a note code and a note number;

synchronizing, in the distributed system, the electronic note identifier in the electronic note identifier set; and after the synchronizing, allocating the electronic note identifier in the electronic note identifier set to the service node.

According to an aspect of the embodiments of this application, an electronic note generation method is provided, applicable to a service node, the service node interacting with a distributed system, the distributed system including a processing node, and the method including:

receiving, by the service node, an electronic note generation request initiated by a request initiator, and obtaining note generation information from the electronic note generation request, the note generation information including a recipient identifier and a resource transfer amount;

initiating an electronic note identifier application request to the processing node according to the electronic note generation request;

obtaining an electronic note identifier from an electronic note identifier set allocated by the processing node, the electronic note identifier set being generated by the processing node and synchronized in the distributed system, and the electronic note identifier including a note code and a note number;

generating an electronic note according to the note generation information and the obtained electronic note identifier; and returning the electronic note to the request initiator in response to the electronic note generation request.

According to an aspect of the embodiments of this application, a computer system for allocating electronic note identifiers is provided. The computer system includes a processing node, one or more processors, and memory. The memory stores instructions that when executed by the one or more processors, cause the one or more processors to perform operations comprising:

receiving, by the processing node, an electronic note identifier application request initiated by a service node;

generating an electronic note identifier set in response to the electronic note identifier application request, the electronic note identifier set including at least one electronic note identifier, and the electronic note identifier including a note code and a note number;

synchronizing, in the distributed system, the electronic note identifier in the electronic note identifier set; and after the synchronizing, allocating the electronic note identifier in the electronic note identifier set to the service node.

According to an aspect of the embodiments of this application, an electronic note generation apparatus is provided, deployed in a service node, the service node interacting with a distributed system, the distributed system including a processing node, and the apparatus including:

a generation request receiving module, configured for the service node to receive an electronic note generation request initiated by a request initiator, and obtain note generation information from the electronic note generation request, the note generation information including a recipient identifier and a resource transfer amount;

an initiating module, configured to initiate an electronic note identifier application request to the processing node according to the electronic note generation request;

an electronic note identifier obtaining module, configured to obtain an electronic note identifier from an electronic note identifier set allocated by the processing node, the electronic note identifier set being generated by the processing node and synchronized in the distributed system, and the electronic note identifier including a note code and a note number;

an electronic note generation module, configured to generate an electronic note according to the note generation information and the obtained electronic note identifier; and an electronic note sending module, configured to return the electronic note to the request initiator in response to the electronic note generation request.

According to an aspect of the embodiments of this application, an electronic note generation system is provided, including a request initiator, a service node, and a processing node in a distributed system, the service node initiating an electronic note identifier application request to the processing node;

the processing node generating an electronic note identifier set in response to the electronic note identifier application request and synchronizing the electronic note identifier set in the distributed system, to allocate an electronic note identifier in the electronic note identifier set to the service node, the electronic note identifier including a note code and a note number;

the request initiator initiating an electronic note generation request to the service node, the electronic note generation request carrying note generation information, and the note generation information including a recipient identifier and a resource transfer amount; and the service node obtaining the electronic note identifier from the electronic note identifier set in response to the electronic note generation request, to generate an electronic note according to the note generation information and the obtained electronic note identifier and return the electronic note to the request initiator.

According to an aspect of the embodiments of this application, an electronic note identifier allocation method is provided, applicable to a distributed system, the distributed system including a proxy node and processing nodes, the method being performed by the proxy node, and the method including:

receiving, by the proxy node, an electronic note identifier application request initiated by a service node;

selecting a processing node for receiving the electronic note identifier application request from the processing nodes included in the distributed system; and distributing the electronic note identifier application request to the selected processing node, so that the processing node performs an electronic note identifier allocation service for the electronic note identifier application request.

According to an aspect of the embodiments of this application, an electronic note identifier allocation apparatus is provided, deployed in a proxy node in a distributed system, the apparatus including:

an identifier application request receiving module, configured for the proxy node to receive an electronic note identifier application request initiated by a service node;

a processing node selection module, configured to select a processing node for receiving the electronic note identifier application request from processing nodes included in the distributed system; and an identifier application request distribution module, configured to distribute the electronic note identifier application request to the selected processing node, so that the processing node performs an electronic note identifier allocation service for the electronic note identifier application request.

According to an aspect of the embodiments of this application, an electronic note generation system is provided, including a request initiator, a service node, and processing nodes and a proxy node in a distributed system, the request initiator initiating an electronic note generation request to the service node, the electronic note generation request carrying note generation information, and the note generation information including a recipient identifier and a resource transfer amount; and the service node initiating an electronic note identifier application request to the proxy node in response to the electronic note generation request;

the proxy node selecting a processing node for receiving the electronic note identifier application request from the processing nodes included in the distributed system and distributing the electronic note identifier application request to the selected processing node;

the processing node generating an electronic note identifier set according to an electronic note issuance quantity in response to the electronic note identifier application request and synchronizing the electronic note identifier set in the distributed system, to allocate an electronic note identifier in the electronic note identifier set to the proxy node, the electronic note identifier including a note code and a note number;

the proxy node returning, to the service node, the electronic note identifier allocated by the processing node; and the service node generating an electronic note according to note generation information carried in the electronic note generation request and the obtained electronic note identifier and returning the electronic note to the request initiator.

According to an aspect of the embodiments of this application, a computer device is provided, including a processor and a memory, the memory storing computer-readable instructions, and the computer-readable instructions, when executed by the processor, implementing the electronic note identifier allocation method or the electronic note generation method described above.

According to an aspect of the embodiments of this application, a storage medium is provided, storing a computer program, the computer program, when executed by a processor, implementing the electronic note identifier allocation method or the electronic note generation method described above.

According to an aspect of the embodiments of this application, a computer program product including instructions is provided, the instructions, when run on a computer, causing the computer to perform the electronic note identifier allocation method or the electronic note generation method described above.

In the foregoing technical solutions, a processing node in a distributed system receives an electronic note identifier application request initiated by a service node, generates an electronic note identifier set in response to the electronic note identifier application request, and synchronizes, in the distributed system, an electronic note identifier in the electronic note identifier set. After the electronic note identifier in the electronic note identifier set is synchronized in the distributed system, the processing node allocates the electronic note identifier in the electronic note identifier set to the service node. Therefore, for the electronic note identifier set including at least one electronic note identifier including a note code and a note number, data consistency between processing nodes is ensured through synchronization on all the processing nodes in the distributed system, and the universality of electronic note identifiers allocated based on the distributed system can be effectively improved since a specific note issuance rule is met by using the note code.

It is to be understood that the above general descriptions and the following detailed descriptions are merely for exemplary and explanatory purposes, and are not intended to limit this application.

BRIEF DESCRIPTION OF THE DRAWINGS

The accompanying drawings, which are incorporated herein and constitute a part of this specification, illustrate embodiments consistent with this application and, together with the specification, serve to explain the principles of this application.

FIG. 15 is a schematic diagram of an electronic invoice according to some embodiments.

Explicit embodiments in this application are shown by using the foregoing accompanying drawings, and more detailed descriptions are provided below. The accompanying drawings and literal descriptions are not intended to limit the scope of the idea of this application in any manner, but explain the idea of this application by referring to specific embodiments for a person skilled in the art.

DESCRIPTION OF EMBODIMENTS

Exemplary embodiments are described in detail herein, and examples of the exemplary embodiments are shown in the accompanying drawings. When the following descriptions are made with reference to the accompanying drawings, unless otherwise indicated, same numbers in different accompanying drawings represent same or similar elements. The implementations described in the following exemplary embodiments do not represent all implementations that are consistent with this application. On the contrary, the implementations are merely examples of apparatuses and methods that are described in detail in the appended claims and that are consistent with some aspects of this application.

As described above, an electronic note identifier allocated based on a distributed system is unique, so that an electronic note is uniquely identified by using the electronic note identifier, thereby ensuring data consistency between processing nodes in the distributed system.

Currently, before the electronic note identifier is allocated based on the distributed system, an unrepeatable random number may be generated in a random generation manner, or an identifier that is universally unique and does not conflict with others, that is, a globally unique identifier, may be created in an identifier creation manner, and the random number or the globally unique identifier is used as the electronic note identifier of the electronic note to uniquely identify the electronic note.

However, no matter whether the electronic note is uniquely identified by using the random number or the globally unique identifier, a specific note issuance rule cannot be met. For example, an issuance batch, an issuance place, or an issuance year of the electronic note cannot be indicated.

Therefore, the electronic note identifier allocated based on the distributed system still has a defect of relatively poor universality.

For this reason, this application provides an electronic note identifier allocation method, which can effectively improve the universality of electronic note identifier allocated based on a distributed system. Correspondingly, an electronic note identifier allocation apparatus is deployed in a computer device having a Von Neumann architecture, for example, a server, to implement the electronic note identifier allocation method.

Figure 1:
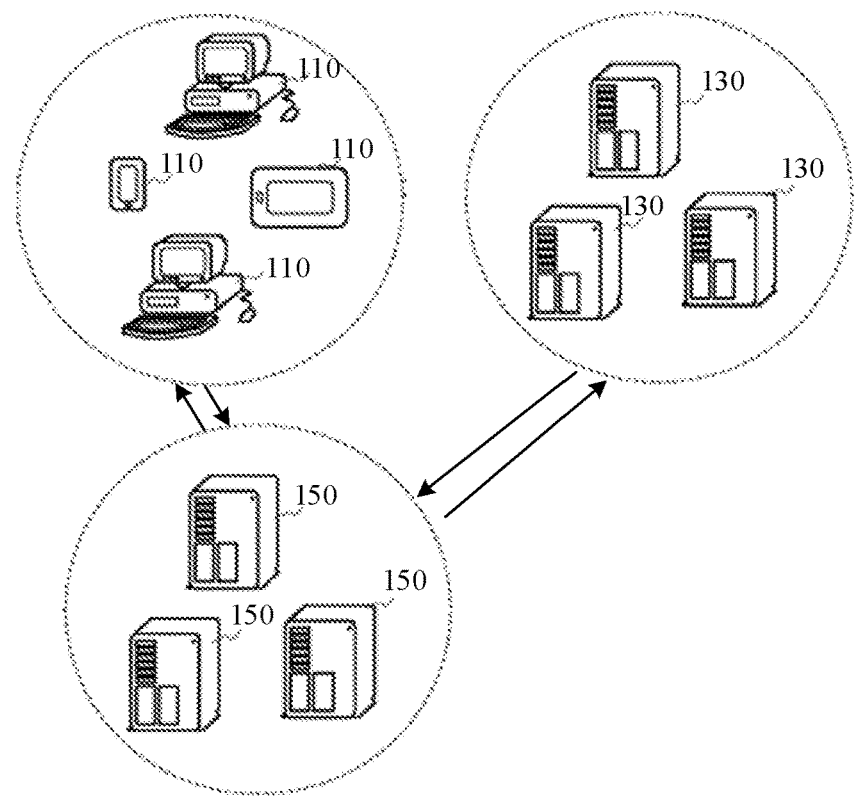
FIG. 1 is a schematic diagram of an implementation environment according to some embodiments.
Figure 1:
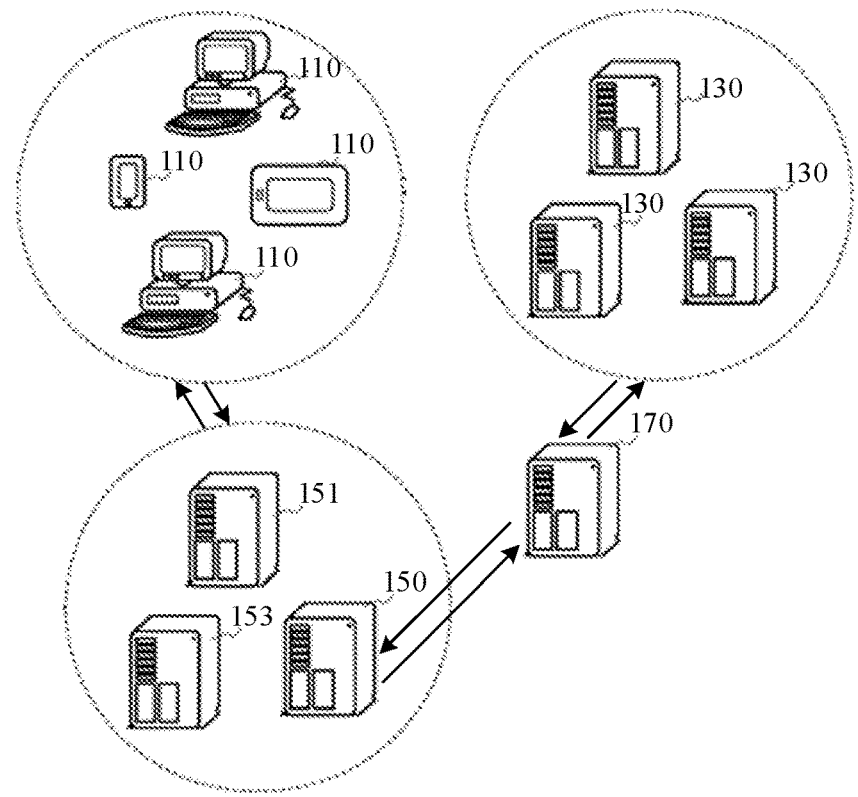

FIG. 1 is a schematic diagram of an implementation environment related to the electronic note identifier allocation method, according to some embodiments.

As shown in FIG. 1(a), the implementation environment includes request initiators 110, as well as processing nodes 130 and service nodes 150 in a distributed system.

The request initiator 110 is configured to initiate an electronic note generation request to the service node 150. The request initiator 110 is a user terminal on which a client may run. For example, the user terminal includes a desktop computer, a notebook computer, a tablet computer, a smartphone, a palmtop computer, or a personal digital assistant. That is, a user initiates an electronic note generation request to the service node 150 by using a client run on the request initiator 110, so that the service node 150 generates an electronic note in response to the electronic note generation request and returns the electronic note to the request initiator 110. For example, in an application scenario, the request initiator 110 may be a smartphone carried by a Taobao buyer, and the service node 150 may be a desktop computer provided for a Taobao seller.

The processing node 130 is a computer device providing backend services. For example, the computer device is a server, and the backend services include an electronic note identifier allocation service. Correspondingly, the distributed system may be a server cluster including a plurality of servers, or may be a cloud computing center including a plurality of servers, which is not limited herein.

The service node 150 may also be a computer device providing backend services. For example, the computer device is a server, and the backend services include an electronic note generation service. In this case, the plurality of service nodes 150 may form another server cluster or another cloud computing center, that is, another distributed system, to process massive concurrent electronic note generation requests.

In this implementation environment, as shown in FIG. 1(a), in the distributed system, a processing node 130 is deployed for each service node 150, so that the processing node 130 deployed for the service node 150 may process an electronic note identifier application request initiated by the service node 150 to the distributed system, and allocate an electronic note identifier to the service node 150.

A network connection is established in advance between the service node 150 and the processing node 130 in a wireless or wired manner, and data is transmitted between the service node 150 and the processing node 130 through the network connection. For example, the transmitted data may be the electronic note identifier application request initiated by the service node 150 to the distributed system, or may be the electronic note identifier allocated by the processing node 130 to the service node 150.

Through interaction between the service node 150 and the processing node 130, the service node 150 initiates the electronic note identifier application request to the processing node 130, to request the processing node 130 to provide an electronic note identifier allocation service.

The processing node 130 allocates the electronic note identifier to the service node 150 in response to the electronic note identifier application request initiated by the service node 150.

Further, in another implementation environment, as shown in FIG. 1(b), in a distributed system, a plurality of processing nodes are deployed for each of service nodes 150, 151, and 153. For example, the plurality of processing nodes 130 are deployed for the service node 150 (processing nodes deployed for the service nodes 151 and 153 are not shown in FIG. 1(b)), so that the plurality of processing nodes 130 deployed for the service node 150 all may process an electronic note identifier application request initiated by the service node 150 to the distributed system.

In this case, the implementation environment further includes a proxy node 170 configured to select a processing node 130 for processing the electronic note identifier application request initiated by the service node 150 from the plurality of processing nodes 130.

Herein, a network connection is established in advance between the proxy node 170 and the service node 150 as well as the processing nodes 130 in a wireless or wired manner, and data is transmitted between the proxy node 170 and the service node 150 as well as the processing nodes 130 through the network connection. For example, the transmitted data includes the electronic note identifier application request initiated by the service node 150 to the distributed system and running data reported by the processing nodes 130 to the proxy node 170.

When the proxy node 170 receives the electronic note identifier application request initiated by the service node 150, through interaction with the processing nodes 130, the proxy node 170 may select a processing node 130 according to the running data reported by the processing nodes 130 to the proxy node 170, to process the electronic note identifier application request initiated by the service node 150, and allocate an electronic note identifier to the service node 150.

Certainly, according to operation requirements, the service node 150, the proxy node 170, and the processing nodes 130 may be deployed in the same distributed system, so that a complete suite of services about an electronic note may be completed by using the same distributed system, which include, but are not limited to, an electronic note identifier allocation service and an electronic note generation service.

Figure 2:
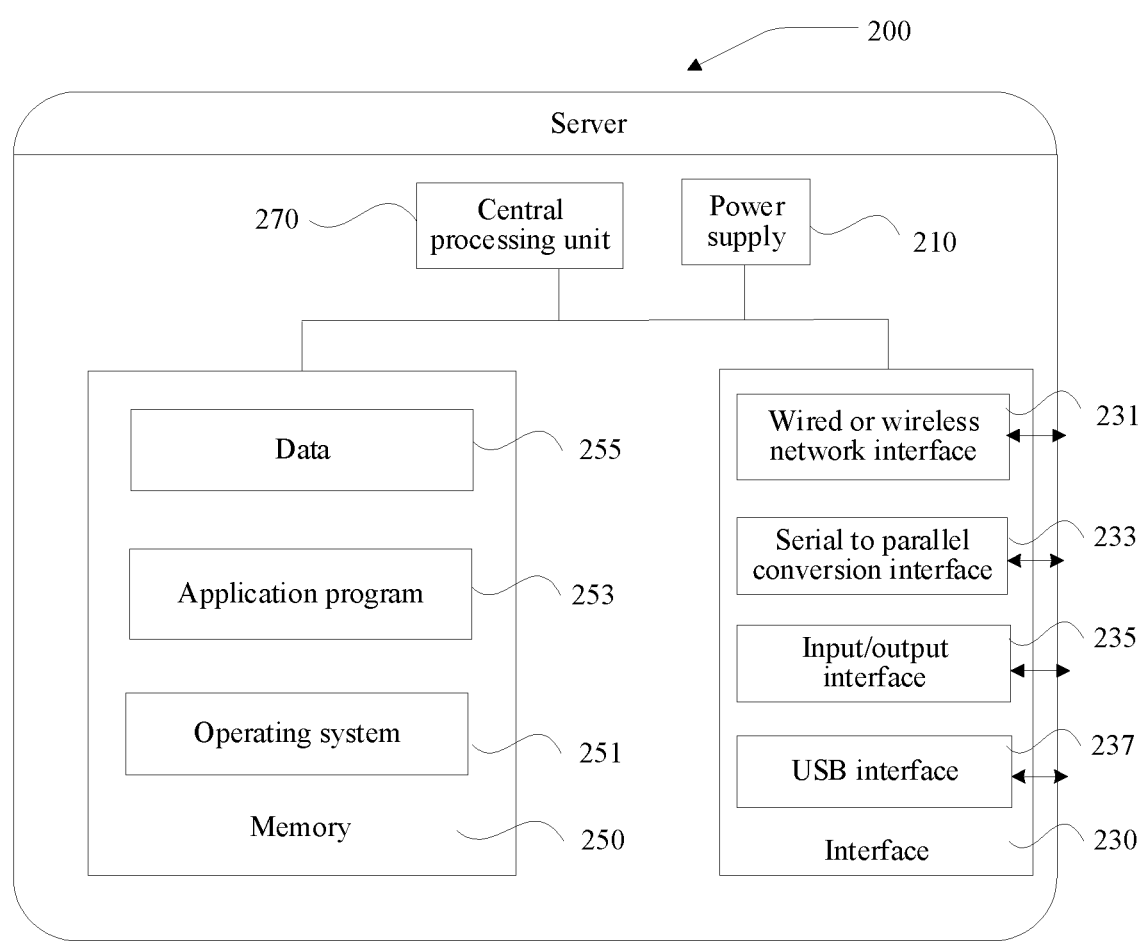
FIG. 2 is a block diagram of a hardware structure of a server according to some embodiments.

FIG. 2 is a block diagram of a hardware structure of a server according to an exemplary embodiment. The server is applicable to the processing node 130 and the service node 150 in the implementation environment shown in FIG. 1, and applicable to the processing node 130, the proxy node 170, and the service node 150 in the implementation environment shown in FIG. 1.

The server is merely an example adapted to this application, and should not be considered as providing any limitation to a use range of this application.

The hardware structure of the server 200 may vary greatly because of differences in configuration or performance. As shown in FIG. 2, the server 200 includes a power supply 210, an interface 230, at least one memory 250, and at least one central processing unit (CPU) 270.

Specifically, the power supply 210 is configured to provide a working voltage for hardware components on the server 200.

The interface 230 includes at least one wired or wireless network interface for interaction with external devices, for example, the interaction between the request initiator 110 and the service node 150, the interaction between the service node 150 and the processing node 130, or the interaction between the processing node 130 and the proxy node 170 in the implementation environment shown in FIG. 1.

Certainly, in other examples adapted to this application, the interface 230 may further include at least one serial to parallel conversion interface 233, at least one input/output interface 235, and at least one USB interface 237, as shown in FIG. 2. This is not specifically limited herein.

The memory 250, that is, a storage medium, as a resource storage carrier, may be a read-only memory, a random access memory, a magnetic disk, an optical disc, or the like. Resources stored in the memory 250 include an operating system 251, an application program 253, data 255, and the like, and a storage manner may be temporary storage or permanent storage.

The operating system 251 is configured to manage and control hardware components on the server 200 and the application program 253 to implement operations and processing on the massive data 255 in the memory 250 by the CPU 270. The operating system may be Windows Server™, Mac OS X™, Unix™, FreeBSD™, or the like.

The application program 253 is a computer program that completes at least one specific task based on the operating system 251, and may include at least one module (not shown in FIG. 2). Each module may include a series of computer-readable instructions for the server 200. For example, both an electronic note identifier allocation apparatus and an electronic note generation apparatus may be considered as application programs 253 deployed in a processing node.

The data 255 may be photos, pictures, and the like stored in the magnetic disk, or may be electronic note identifiers, note generation information, and the like stored in the memory 250.

The CPU 270 may include one or more processors, and is configured to communicate with the memory 250 by using at least one communication bus, to read the computer-readable instructions stored in the memory 250, to implement the operations and processing on the massive data 255 in the memory 250. For example, the electronic note identifier allocation method or an electronic note generation method may be completed by the CPU 270 by reading a series of computer-readable instructions stored in the memory 250.

In addition, this application may alternatively be implemented through a hardware circuit or a hardware circuit in combination with software. Therefore, implementations of this application are not limited to any specific hardware circuit, software, or a combination thereof.

Figure 3:
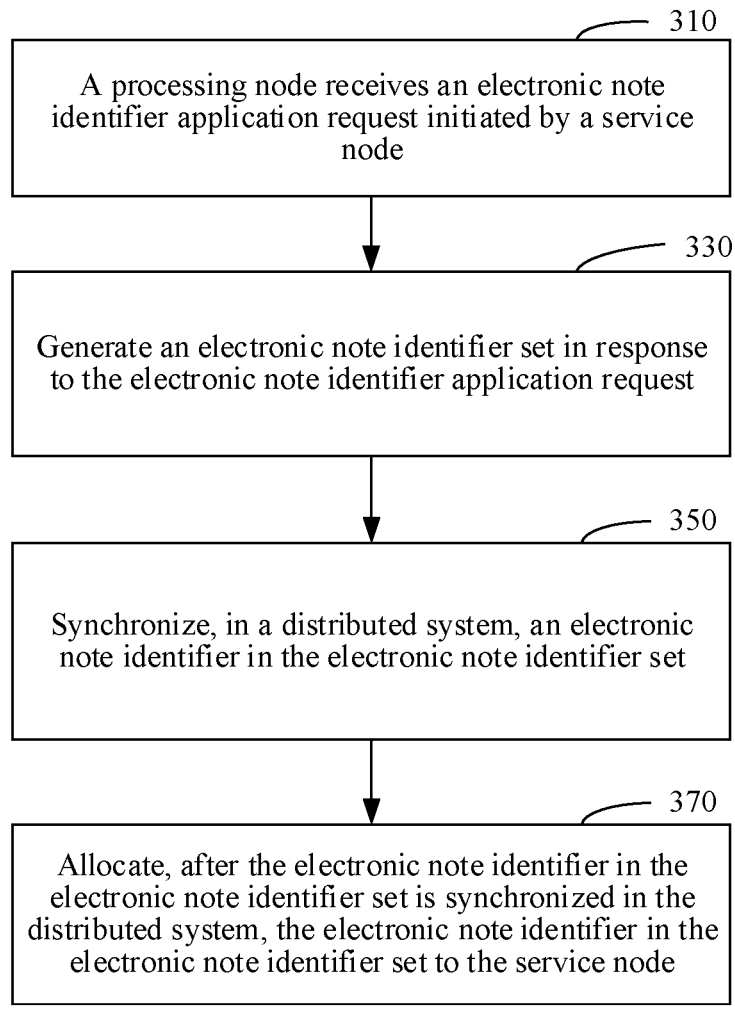
FIG. 3 is a flowchart of an electronic note identifier allocation method according to some embodiments.

Referring to FIG. 3, in an exemplary embodiment, an electronic note identifier allocation method is provided, applicable to a distributed system in the implementation environment shown in FIG. 1. The distributed system includes a processing node, and a structure of the processing node may be shown in FIG. 2.

The electronic note identifier allocation method may be performed by a processing node in the distributed system, and may include the following steps:

Step 310. The processing node receives an electronic note identifier application request initiated by a service node.

The electronic note identifier application request is initiated by a merchant to the distributed system by using the service node to apply for an electronic note identifier.

The service node provides an application request initiation entrance for the merchant. When the merchant expects a processing node in the distributed system to perform an electronic note identifier allocation service, the merchant may trigger a relevant operation at the application request initiation entrance, so that the service node detects the operation, and initiates an electronic note identifier application request to the distributed system.

For example, the application request initiation entrance is a virtual button provided by the service node, and when the merchant clicks/taps the virtual button, the service node initiates an electronic note identifier application request to the distributed system. The click/tap operation is considered as a relevant operation triggered by the merchant at the application request initiation entrance.

Then, a processing node in the distributed system may receive the electronic note identifier application request initiated by the merchant by using the service node, learn that the merchant applies for an electronic note identifier, and perform the electronic note identifier allocation service for the merchant subsequently.

Step 330. Generate an electronic note identifier set in response to the electronic note identifier application request.

First, an electronic note identifier of an electronic note includes a note code. The note code is set to meet a specific note issuance rule, that is, the note code is used for representing issuance information required for the electronic note. The issuance information includes, but is not limited to, an issuance place, an issuance year, an issuance batch, an issuance form, a category of an industry type to which the electronic note is applicable, a category of a note type to which the electronic note is applicable, and an amount limit. In the same batch, different electronic notes have the same note code.

Therefore, the electronic note identifier of the electronic note further includes a note number. The note number is used as a unique identifier for identifying the electronic note in the same batch. That is, in the same batch, different electronic notes have different note numbers.

It may be learned from the above that, an electronic note identifier including a note code and a note number may be used as a unique code of an electronic note for uniquely identifying the electronic note while meeting a specific note issuance rule.

In an exemplary implementation, the processing node may generate the electronic note identifier set according to an electronic note issuance quantity in response to the electronic note identifier application request.

It is to be understood that, when common paper notes are issued, considering issuance efficiency of the paper notes, a plurality of paper notes may be generally issued at a time. Correspondingly, electronic notes are subject to an electronic note issuance quantity. Therefore, an electronic note identifier allocated to the service node may be within a range. That is, the electronic note identifier set generated according to the electronic note issuance quantity includes at least one electronic note identifier.

For example, in electronic note identifiers of the same batch allocated by the processing node to the service node, all note codes are 144031809110, and note numbers are 00000001~00000010.

In the above example, the first five digits "14403" represents that an issuance place of electronic notes is Beijing, the next two digits "18" represents that an issuance year of the electronic notes is 2018, the digit "0" represents that a category of an industry type to which the electronic notes are applicable is a common category, the digit "9" represents that a category of a note type to which the electronic notes are applicable is a common invoice, the digit "1" represents that an issuance batch of the electronic notes is the first batch in 2018, the digit "1" represents that an issuance form of the electronic notes is an accounting form, and the last digit "0" represents that an amount limit of the electronic notes is an unlimited amount.

The note numbers 00000001~00000010 represent that, in this batch, the processing node allocates 10 electronic note identifiers to the service node at a time.

Certainly, according to an actual requirement of an application scenario, for the same batch, a quantity of electronic note identifiers in the electronic note identifier set allocated by the processing node to the service node at a time may be flexibly adjusted.

For example, in a high concurrency scenario, for the same batch, a quantity of electronic note identifiers allocated by the processing node to the service node at a time is 1000. In this way, the frequency at which the service node applies for electronic note identifiers may be reduced, which helps to reduce concurrent electronic note identifier application requests and improve the allocation efficiency of electronic note identifiers. Besides, the quantity of electronic note identifiers allocated by the processing node to the service node may be adjusted, which helps to improve the service performance of the processing node and fully ensure the service performance of the distributed system.

Alternatively, in another application scenario, for the same batch, the processing node may allocate, according to a quantity of electronic note identifiers that the service node actually needs to apply for, an actual required quantity of electronic note identifiers to the service node. For example, assuming that the quantity of electronic note identifiers that the service node applies for is 200, a quantity of electronic note identifiers allocated by the processing node to the service node at a time is 200.

It may be learned from the above that, the electronic note issuance quantity may be set according to an actual processing capability of the processing node, or depending on an actual required quantity of the service node.

Step 350. Synchronize, in the distributed system, an electronic note identifier in the electronic note identifier set.

As described above, the electronic note identifier set includes at least one electronic note identifier, and the electronic note identifier includes a note code and a note number.

It may be understood that, in the distributed system, each processing node may allocate an electronic note identifier, but the electronic note identifier is neither an unrepeatable random number generated in a random generation manner, nor a universally unique identifier that is created in an identifier creation manner and does not conflict with others, so that the electronic note identifier allocated by the each processing node in the electronic note identifier set cannot be ensured to be globally unique in the distributed system.

Therefore, in this embodiment, the electronic note identifier in the electronic note identifier set needs to be synchronized on all processing nodes in the distributed system, to ensure data consistency between the processing nodes in the distributed system.

A synchronization process for ensuring the data consistency between the processing nodes in the distributed system is implemented by using a consensus algorithm. For example, the consensus algorithm includes, but is not limited to, a raft algorithm, a paxos algorithm, and a distributed hash algorithm.

After the electronic note identifier in the electronic note identifier set is synchronized in the distributed system, all the processing nodes in the distributed system record the synchronized electronic note identifier, to avoid the recorded synchronized electronic note identifier when generating an electronic note identifier set subsequently, to prevent repeated electronic note identifiers from existing in the distributed system, thereby achieving the data consistency between the processing nodes.

Step 370. Allocate, after the electronic note identifier in the electronic note identifier set is synchronized in the distributed system, the electronic note identifier in the electronic note identifier set to the service node.

As the electronic note identifier in the electronic note identifier set is recorded in all the processing nodes in the distributed system, the electronic note identifier is synchronized in the distributed system. In this case, the processing node may determine that the synchronized electronic note identifier is globally unique, so that the synchronized electronic note identifier may be allocated to the service node.

The service node may select an electronic note identifier from the obtained electronic note identifier set to uniquely identify an electronic note during note generation.

In the process described above, distributed system-based electronic note identifier allocation is implemented. The electronic note identifier includes a note code and a note number, so that an electronic note meeting a specific note issuance rule may be made out in a convenient environment of the distributed system, the universality of the electronic note identifier is effectively improved, and data consistency between the processing nodes in the distributed system is also ensured, thereby helping to fully utilize the advantages of the distributed system to respond to massive concurrent electronic note identifier application requests.

Figure 4:
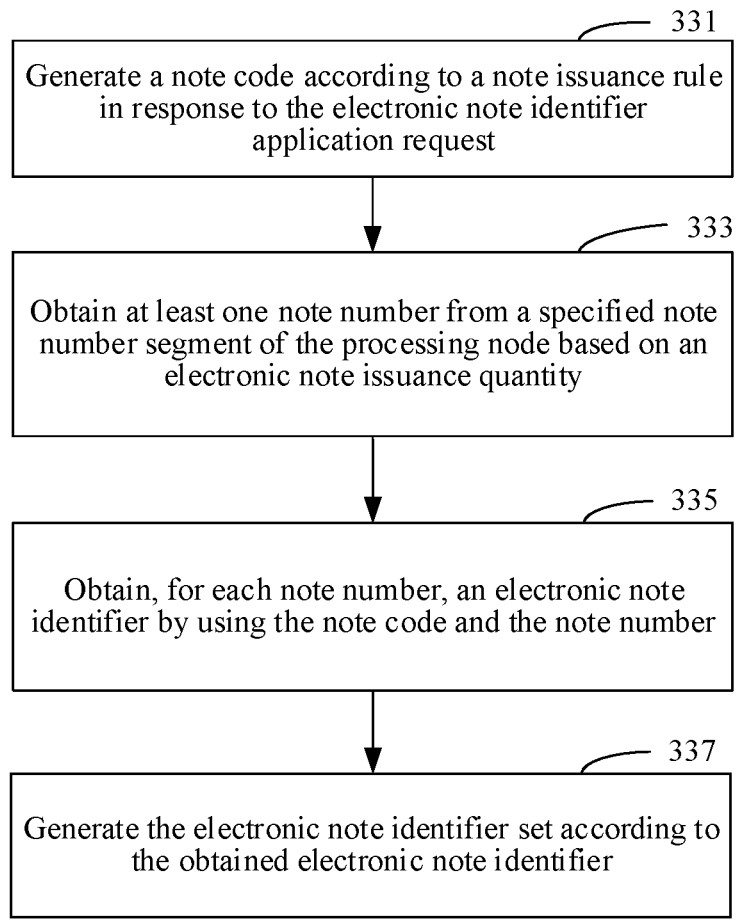
FIG. 4 is a flowchart of an embodiment of step 330 in the embodiment corresponding to FIG. 3.

Referring to FIG. 4, in an exemplary embodiment, step 330 may include the following steps:

Step 331. Generate a note code according to a note issuance rule in response to the electronic note identifier application request.

The note issuance rule is to represent issuance information of an electronic note, for example, an issuance place, an issuance year, an issuance batch, an issuance form, a category of an industry type to which the electronic note is applicable, a category of a note type to which the electronic note is applicable, and an amount limit of the electronic note.

To enable the electronic note identifier allocated based on the distributed system to meet a specific note issuance rule, a note code is set, that is, the note code is used for representing the issuance information of the electronic note.

Therefore, the note code may be generated according to the note issuance rule.

For example, a note issuance rule M is to represent an issuance place, an issuance year, and an issuance batch of an electronic note. Then a note code generated according to the note issuance rule M may be used for representing the issuance place, the issuance year, and the issuance batch of the electronic note.

For example, the note code of the electronic note is 14403181. 14403 represents that the issuance place of the electronic note is Beijing, 18 represents that the issuance year of the electronic note is 2018, and 1 represents that the issuance batch of the electronic note is the first batch in 2018.

Step 333. Obtain at least one note number from a specified note number segment of the processing node based on the electronic note issuance quantity.

As described above, the note number is used as a unique identifier for identifying an electronic note in the same batch.

It may be understood that an electronic note issuance quantity for the same batch is within a range, and correspondingly, the note number is also within a range. For example, if note numbers are 00000001~99999999, it indicates that the electronic note issuance quantity in this batch is 99999999, and different electronic notes are uniquely identified by using different note numbers.

Certainly, according to an actual requirement of an application scenario, for the same batch, the electronic note issuance quantity may be flexibly adjusted. This is not specifically limited in this embodiment.

In the distributed system, all the processing nodes may allocate electronic note identifiers. In other words, in each batch, note numbers in the electronic note identifiers allocated by all the processing nodes come from the same note number range. For example, the note numbers come from 00000001~99999999.

Therefore, to ensure that an allocated electronic note identifier to have a globally unique note number in the distributed system, in this embodiment, all the processing nodes are provided with different specified note number segments, to prevent different processing nodes from allocating repeated electronic note identifiers, thereby achieving the data consistency between the processing nodes in the distributed system.

For example, the distributed system includes a processing node A, a processing node B, and a processing node C. A specified note number segment for the processing node A is 00000001~33333333, a specified note number segment for the processing node B is 33333334~66666666, and a specified note number segment for the processing node C is 66666667~99999999.

Based on this, only after the specified note number segment of the processing node is determined, a corresponding note number can be obtained according to the electronic note issuance quantity.

In the foregoing example, assuming that the electronic note issuance quantity is 200, the processing node A may obtain note numbers 00000001~00000200 from the specified note number segment 00000001~33333333.

Similarly, the processing node B may obtain note numbers 33333334~33333533 from the specified note number segment 33333334~66666666. The processing node C may obtain note numbers 66666667~66666866 from the specified note number segment 66666667~99999999.

Certainly, the note numbers may be selected sequentially from the specified note number segment of the processing node, or may be randomly selected from the specified note number segments of the processing node. This is not specifically limited in this embodiment.

Step 335. Obtain, for each note number, an electronic note identifier by using the note code and the note number.

As described above, in the same batch, different electronic notes have the same note code, and different electronic notes have different note numbers.

Therefore, in the same batch, electronic note identifiers including the same note code and different note numbers can uniquely identify electronic notes issued in this batch as unique codes of the electronic notes issued in this batch while meeting a specific note issuance rule.

For example, in the same batch, all the note codes are 144031809110, and the note numbers are 00000001~00000200. Then, obtained electronic note identifiers are 14403180911000000001~14403180911000000200. That is, the obtained electronic note identifiers uniquely identify 200 electronic notes issued in this batch.

Step 337. Generate the electronic note identifier set according to the obtained electronic note identifier.

In the foregoing example, the obtained electronic note identifiers are 14403180911000000001~14403180911000000200, which form an electronic note identifier set required for the 200 electronic notes issued in this batch.

With reference to the foregoing embodiment, the unique code of the electronic note is implemented based on the combination of the note code and the note number, so that a specific note issuance rule is met, that is, a requirement of the electronic note identifier for a specific "code+number" mode is met, thereby helping to improve the universality of the electronic note identifier allocated based on the distributed system.

Figure 5:
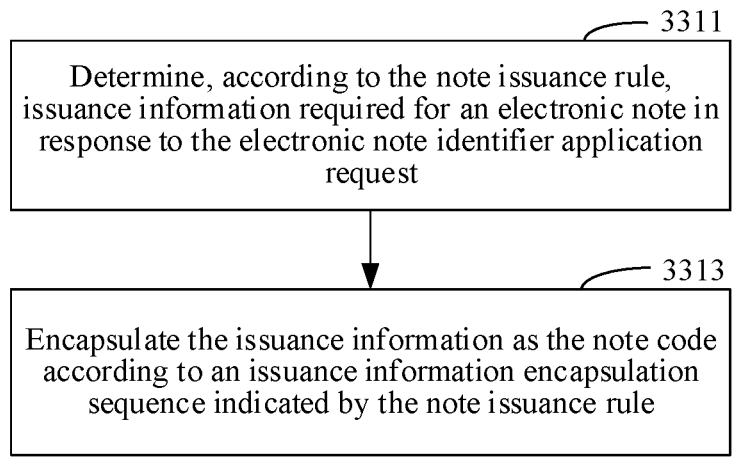
FIG. 5 is a flowchart of an embodiment of step 331 in the embodiment corresponding to FIG. 4.

Referring to FIG. 5, in an exemplary embodiment, step 331 may include the following steps:

Step 3311. Determine, according to the note issuance rule, issuance information required for an electronic note in response to the electronic note identifier application request.

To be specific, if the note issuance rule is to represent an issuance place, an issuance year, an issuance batch, issuance forms, a category of an industry type to which the electronic note is applicable, a category of a note type to which the electronic note is applicable, and an amount limit of the electronic note, based on the note issuance rule, the issuance information required for the electronic note may be determined, including: the issuance place, the issuance year, the issuance batch, the issuance forms, the category of the industry type to which the electronic note is applicable, the category of the note type to which the electronic note is applicable, and the amount limit of the electronic note.

Step 3313. Encapsulate the issuance information as the note code according to an issuance information encapsulation sequence indicated by the note issuance rule.

It is to be understood that the note code includes a string of orderly characters (for example, digits), so as to represent the issuance information required for the electronic note by using the orderly characters.

Therefore, the note issuance rule not only indicates the issuance information of the electronic note needing to be represented, but also indicates the issuance information encapsulation sequence, so that the processing node can generate the note code of the electronic note accordingly.

For example, it is assumed that the note issuance rule indicates that the first five digits represent the issuance place of the electronic note, the sixth and seventh digits represent the issuance year of the electronic note, and the eighth digit represents the issuance batch of the electronic note.

Then, the processing node may determine that the issuance information required for the electronic note includes: the issuance place, the issuance year, and the issuance batch of the electronic note.

After determining that the issuance place of the electronic note is Beijing, the issuance year of the electronic note is 2018, and the issuance batch of the electronic note is the first batch in 2018, the processing node may obtain a note code 14403181 based on the issuance information encapsulation sequence indicated by the note issuance rule.

The first five digits 14403 represent that the issuance place of the electronic note is Beijing, the sixth and seventh digits 18 represent that the issuance year of the electronic note is 2018, and the eighth digit 1 represents that the issuance batch of the electronic note is the first batch in 2018.

With reference to the foregoing embodiment, a note code generation solution based on a note issuance rule is implemented, so that an electronic note identifier meeting a specific note issuance rule is implemented, thereby helping to ensure the universality of the electronic note identifier allocated based on the distributed system.

Figure 6:
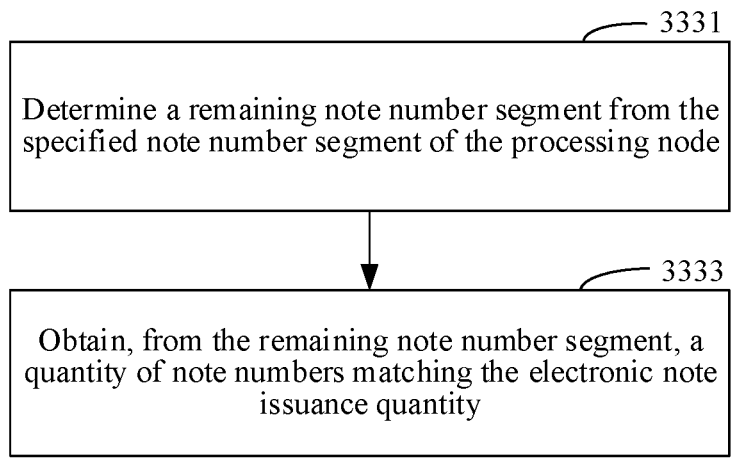
FIG. 6 is a flowchart of an embodiment of step 333 in the embodiment corresponding to FIG. 4.

Referring to FIG. 6, in an exemplary embodiment, step 333 may include the following steps:

Step 3331. Determine a remaining note number segment from the specified note number segment of the processing node.

It is to be understood that every time the service node initiates an electronic note identifier application request, the processing node distributes a certain number of electronic note identifiers, and accordingly, the service node may obtain a certain quantity of electronic note identifiers. In the same batch, note codes are the same, and only note numbers are different when the service node applies for electronic notes. To be specific, in the specified note number segment of the processing node, a quantity of used note numbers is gradually increased, and a quantity of unused note numbers is gradually decreased.

Therefore, when a next electronic note identifier allocation is performed, the processing node can perform the electronic note identifier allocation service based only on the unused note numbers. That is, the processing node needs to determine the remaining note number segment in the specified note number segment. The remaining note number segment essentially indicates the unused note numbers in the specified note number segment of the processing node.

For example, it is assumed that the specified note number segment of the processing node A is 00000001~33333333.

If a quantity of electronic notes issued at a current time is 200, note numbers of the electronic notes issued at the current time are 00000001~00000200. In this case, the note numbers 00000001~00000200 are considered as used note numbers in the specified note number segment of the processing node A. Accordingly, a remaining note number segment is 00000201~33333333. That is, note numbers 00000201~33333333 are unused note numbers in the specified note number segment of the processing node A.

Step 3333. Obtain, from the remaining note number segment, a quantity of note numbers matching the electronic note issuance quantity.

In the foregoing example, assuming that the electronic note issuance quantity is 200, that is, if a quantity of electronic notes issued at a next time is 200, after it is determined that the remaining note number segment is 00000201~33333333, it may be learned that note numbers of the electronic notes issued at the next time are 00000201~00000400.

Certainly, the note numbers may be selected sequentially from the remaining note number segment, or may be randomly selected from the remaining note number segment. This is not specifically limited in this embodiment.

With reference to the foregoing embodiment, the note number is obtained, and a requirement of the electronic note identifier for a specific "code+number" mode is met, thereby helping to ensure the universality of the electronic note identifier allocated based on the distributed system.

Figure 7:
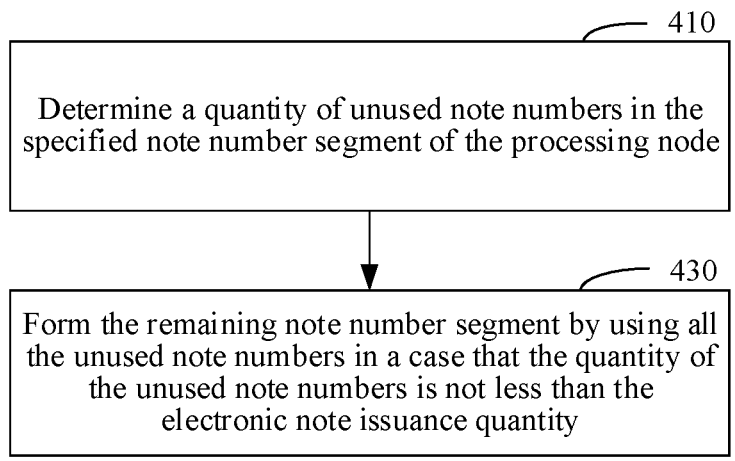
FIG. 7 is a flowchart of an embodiment of step 3331 in the embodiment corresponding to FIG. 6.

Referring to FIG. 7, in an exemplary embodiment, step 3331 may include the following steps:

Step 410. Determine a quantity of unused note numbers in the specified note number segment of the processing node.

In the foregoing example, it is assumed that the specified note number segment of the processing node A is 00000001~33333333.

If a quantity of electronic notes issued at the current time is 200, note numbers of the electronic notes issued at the current time are 00000001~00000200, and unused note numbers in the specified note number segment of the processing node A are 00000201~33333333.

In this case, it may be determined that a quantity of the unused note numbers in the specified note number segment of the processing node A is 33333132.

It may be understood that, if an electronic note issuance quantity at a next time is also 200, the quantity of the unused note numbers in the specified note number segment of the processing node A is sufficient for issuance of electronic notes at the next time. On the contrary, if the electronic note issuance quantity at the next time is greater than 33333132, for this batch, the quantity of the unused note numbers in the specified note number segment of the processing node A is insufficient for issuance of electronic notes at the next time.

Based on this, before the remaining note number segment is determined, it needs to be determined first whether the quantity of the unused note numbers is greater than the electronic note issuance quantity.

If the quantity of the unused note numbers is not less than the electronic note issuance quantity, step 430 is performed.

On the contrary, if the quantity of the unused note numbers is less than the electronic note issuance quantity, step 420 is performed.

Step 430. Form the remaining note number segment by using all the unused note numbers in a case that the quantity of the unused note numbers is not less than the electronic note issuance quantity.

To be specific, if the electronic note issuance quantity at the next time is also 200, the remaining note number segment is all the unused note numbers 00000201~33333333 in the specified note number segment of the processing node A.

Figure 8:
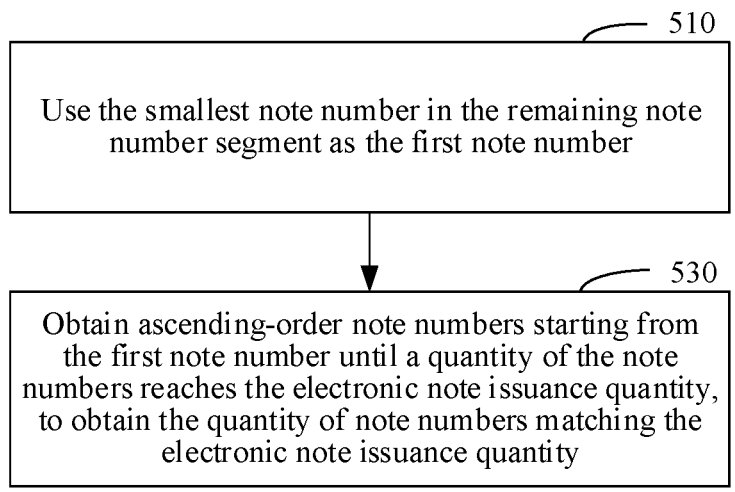
FIG. 8 is a flowchart of an embodiment of step 3333 in the embodiment corresponding to FIG. 6.

Correspondingly, referring to FIG. 8, in an exemplary embodiment, step 3333 may include the following steps:

Step 510. Use the smallest note number in the remaining note number segment as the first note number.

Step 530. Obtain ascending-order note numbers starting from the first note number until a quantity of the note numbers reaches the electronic note issuance quantity, to obtain the quantity of note numbers matching the electronic note issuance quantity.

In this embodiment, note numbers are obtained sequentially from the remaining note number segment.

Specifically, based on the remaining note number segment 00000201~33333333, when the electronic note issuance quantity at the next time is 200, the smallest note number 00000201 is used as the first note number, and ascending-order note numbers are obtained starting from the first note number. That is, 00000202 is the second note number, 00000203 is the third note number, . . . , and 00000400 is the last note number. In this case, a quantity of the note numbers reaches the electronic note issuance quantity, that is, 200.

In the foregoing process, a solution of allocating electronic note identifiers in the same batch is implemented, thereby ensuring the implementation of the electronic note identifier allocation service based on the same batch.

In the same batch, note codes of electronic notes are the same, but note numbers are different. Therefore, an electronic note is uniquely identified by using a combination of a note code and a note number.

Figure 9:
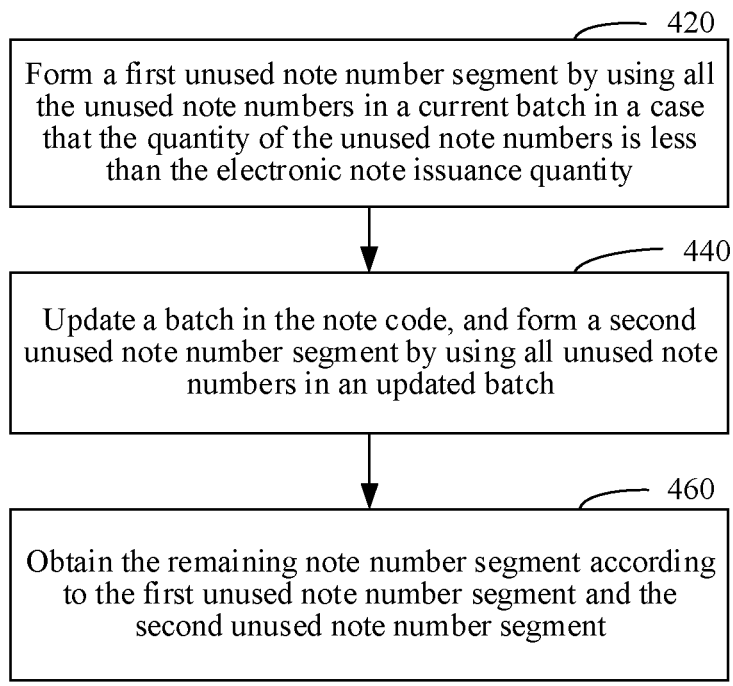
FIG. 9 is a flowchart of another embodiment of step 3331 in the embodiment corresponding to FIG. 6.

Referring to FIG. 9, in an exemplary embodiment, step 3331 may further include the following steps:

Step 420. Form a first unused note number segment by using all the unused note numbers in a current batch in a case that the quantity of the unused note numbers is less than the electronic note issuance quantity.

Step 440. Update a batch in the note code, and form a second unused note number segment by using all unused note numbers in an updated batch.

Step 460. Obtain the remaining note number segment according to the first unused note number segment and the second unused note number segment.

As described above, if the electronic note issuance quantity at the next time is greater than 33333132, the quantity of the unused note numbers in the specified note number segment of the processing node A is insufficient for issuance of electronic notes at the next time. In this case, a batch needs to be added additionally, to ensure that there are sufficient unused note numbers for issuance of electronic notes at the next time.

That is, if the electronic note issuance quantity at the next time reaches 33333135, based on the first batch in 2018, that is, the current batch, the first unused note number segment is all the unused note numbers 00000201~33333333 in the specified note number segment of the processing node A.

In addition, the newly added batch is the second batch in 2018, that is, the updated batch, and note numbers in the specified note number segment 00000001~33333333 of the processing node A are all considered as unused note numbers, that is, considered as the second unused note number segment.

Based on this, the remaining note number segment is the first unused note number segment 00000201~33333333 and the second unused note number segment 00000001~33333333, so as to ensure that there are sufficient unused note numbers for issuance of electronic notes at the next time.

Figure 10:
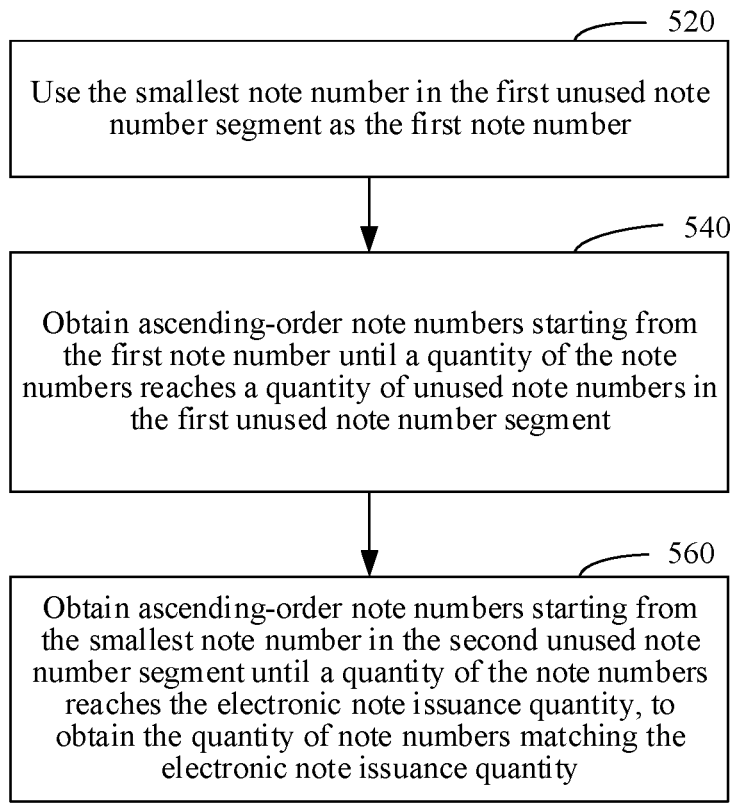
FIG. 10 is a flowchart of another embodiment of step 3333 in the embodiment corresponding to FIG. 6.

Accordingly, referring to FIG. 10, in an exemplary embodiment, step 3333 may include the following steps:

Step 520. Use the smallest note number in the first unused note number segment as the first note number.

Step 540. Obtain ascending-order note numbers starting from the first note number until a quantity of the note numbers reaches a quantity of unused note numbers in the first unused note number segment.

Step 560. Obtain ascending-order note numbers starting from the smallest note number in the second unused note number segment until a quantity of the note numbers reaches the electronic note issuance quantity, to obtain the quantity of note numbers matching the electronic note issuance quantity.

In this embodiment, note numbers are obtained sequentially from the remaining note number segment.

Specifically, the remaining note number segment includes the first unused note number segment and the second unused note number segment.

Based on the first unused note number segment 00000201~33333333, when the electronic note issuance quantity at the next time is 33333135, the smallest note number 00000201 in the first unused note number segment is used as the first note number, and ascending-order note numbers are obtained starting from the first note number. That is, 00000202 is the second note number, 00000203 is the third note number, and so on, until the last note number 33333333 in the first unused note number segment. In this case, a quantity of the note numbers reaches the quantity of the unused note numbers in the first unused note number segment, that is, 33333132, but has not reached the electronic note issuance quantity 33333135.

Further, based on the second unused note number segment 00000001~33333333, the smallest note number 00000001 in the second unused note number segment is used as the antepenultimate note number, and ascending-order note numbers are obtained starting from the antepenultimate note number. That is, 00000002 is used as the penultimate note number, and 00000003 is used as the last note number. In this case, a quantity of the note numbers reaches the electronic note issuance quantity 33333135.

With reference to the foregoing embodiment, based on seamless connection between different batches, a solution of allocating electronic note identifiers in different batches is implemented, thereby ensuring the implementation of the electronic note identifier allocation service based on different batches.

In different batches, note codes of electronic notes are different. That is, when two different batches are included, there may be the same note number in the two different batches. However, note numbers in the same batch are different. Therefore, an electronic note can still be identified by using a combination of a note code and a note number.

Figure 11:
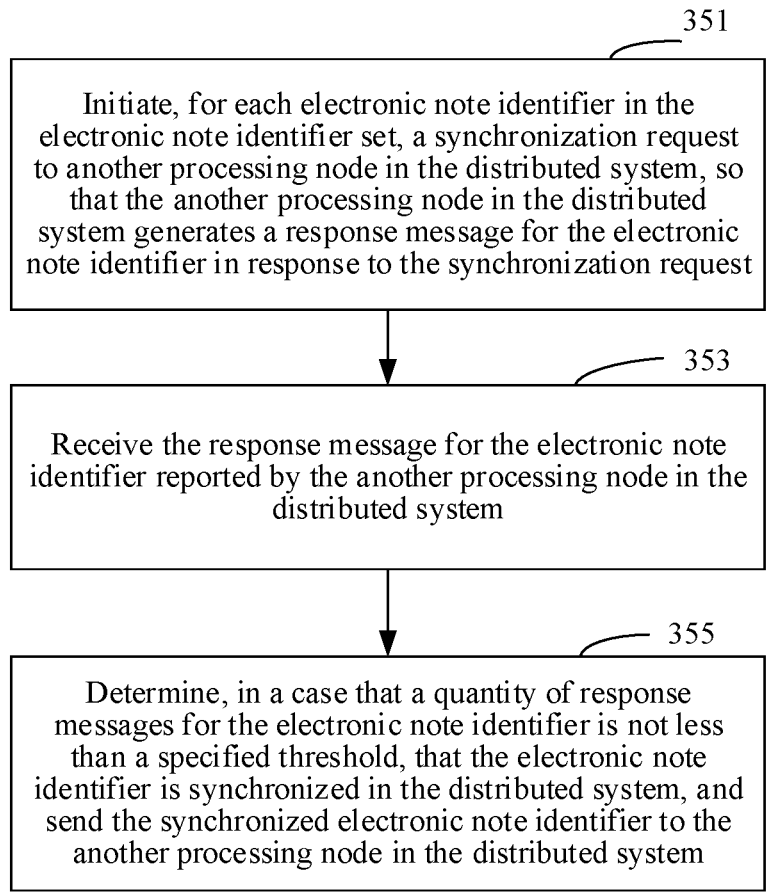
FIG. 11 is a flowchart of an embodiment of step 350 in the embodiment corresponding to FIG. 3.

Referring to FIG. 11, in an exemplary embodiment, step 350 may include the following steps:

Step 351. Initiate, for each electronic note identifier in the electronic note identifier set, a synchronization request to another processing node in the distributed system, so that the another processing node in the distributed system generates a response message for the electronic note identifier in response to the synchronization request.

Step 353. Receive the response message for the electronic note identifier reported by the another processing node in the distributed system.

Step 355. Determine, in a case that a quantity of response messages for the electronic note identifier is not less than a specified threshold, that the electronic note identifier is synchronized in the distributed system, and send the synchronized electronic note identifier to the another processing node in the distributed system.

In this embodiment, a synchronization process is implemented based on a paxos algorithm.

For example, it is assumed that an electronic note identifier set of the processing node A in the distributed system is 14403180911000000001~14403180911100000010.

The processing node A initiates a synchronization request about an electronic note identifier 14403180911000000001 (hereinafter referred to as T for short) in the electronic note identifier set to another processing node in the distributed system to request the another processing node to respond. If the another processing node has never responded to the synchronization request about the electronic note identifier T, the another processing node generates a response message for the electronic note identifier T in response to the synchronization request about the electronic note identifier T, and feeds back the response message to the processing node A.

In this case, if a quantity of received response messages for the electronic note identifier T is not less than a specified threshold, the processing node A may consider that the electronic note identifier T may be synchronized in the distributed system, and send the electronic note identifier T to another processing node in the distributed system to achieve data consistency about the electronic note identifier T between the processing nodes in the distributed system.

Certainly, according to an actual requirement of an application scenario, the specified threshold may be flexibly adjusted. This is not specifically limited in this embodiment.

With reference to the foregoing embodiment, transmission consistency of the electronic note identifier in the distributed system is maintained based on the paxos algorithm, so that the electronic note identifiers recorded between the processing nodes are all globally unique, thereby fully ensuring the data consistency between the processing nodes in the distributed system.

However, in the related art, the processing node in the distributed system easily runs abnormally, and once the processing node runs abnormally, a corresponding service node cannot generate an electronic note normally.

Therefore, the electronic note identifier allocated based on the distributed system is still limited by relatively poor reliability.

Figure 12:
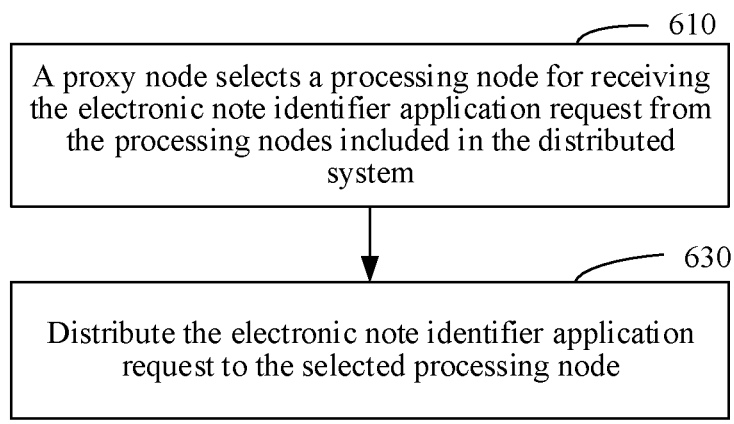
FIG. 12 is a flowchart of another electronic note identifier allocation method according to some embodiments.

Referring to FIG. 12, in an exemplary embodiment, the distributed system further includes a proxy node.

It may be understood that, to ensure the reliability of the distributed system, a plurality of processing nodes may be deployed in the distributed system for the same electronic note identifier application request, to facilitate processing of the electronic note identifier application request.

Therefore, the proxy node is responsible for selecting one processing node for processing the electronic note identifier application request from the plurality of processing nodes.

The processing node may be randomly selected from the plurality of deployed processing nodes, or may be selected from the plurality of deployed processing nodes according to running statuses of the processing nodes, or may be selected according to physical distances between the service node and the processing nodes.

Specifically, before step 310, the method may further include the following steps:

Step 610. The proxy node selects a processing node for receiving the electronic note identifier application request from the processing nodes included in the distributed system.

Step 630. Distribute the electronic note identifier application request to the selected processing node.

With reference to the foregoing embodiment, a plurality of processing nodes are deployed in the distributed system for the same electronic note identifier application request, so that even one of the processing nodes runs abnormally, the electronic note identifier application request can still be processed by a processing node running normally, thereby fully ensuring the reliability of the distributed system.

Figure 13:
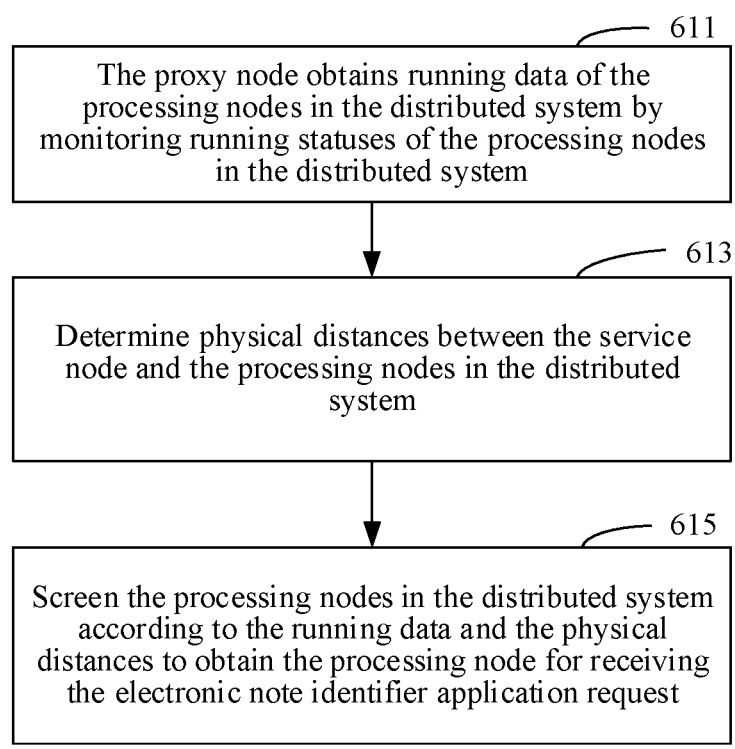
FIG. 13 is a flowchart of an embodiment of step 610 in the embodiment corresponding to FIG. 12.

Referring to FIG. 13, in an exemplary embodiment, step 610 may include the following steps:

Step 611. The proxy node obtains running data of the processing nodes in the distributed system by monitoring running statuses of the processing nodes in the distributed system.

The running data of the processing node includes a load quantity, a memory usage, a CPU usage, a network rate, a packet loss rate, and the like, and is obtained by monitoring the running status of the processing node in the distributed system by the proxy node.

Step 613. Determine physical distances between the service node and the processing nodes in the distributed system.

Step 615. Screen the processing nodes in the distributed system according to the running data and the physical distances to obtain the processing node for receiving the electronic note identifier application request.

Specifically, based on the distributed system, a first score a of the processing node is determined according to the running data of the processing node, and a second score b of the processing node is determined according to the physical distance between the processing node and the service node.

Then, based on weight coefficients m and n respectively corresponding to the running data and the physical distance, a score (=a*m+b*n) of the processing node is obtained.

Then, based on scores of all the processing nodes in the distributed system, a processing node with the highest score may be used as the processing node for receiving the electronic note identifier application request.

In the foregoing process, the processing nodes are screened based on the running data and the physical distance, thereby fully ensuring the greatest advantage of the selected processing node, such as the smallest physical distance from the service node or running best. Then, when the electronic note identifier allocation service is performed based on the selected processing node, a probability of an abnormal interruption is the smallest, thereby helping to improve the reliability of the distributed system and helping to improve the allocation efficiency of the electronic note identifier.

In an exemplary embodiment, the method may further include the following step:

updating, by the proxy node, the processing nodes in the distributed system by monitoring the running statuses of the processing nodes in the distributed system.

It is to be understood that, in a process of performing the electronic note identifier allocation service, any processing node may run abnormally at any time, for example, the processing node crashes or breaks down, and if the abnormal processing node is not debugged in time, the electronic note identifier allocation service may be interrupted abnormally, thereby affecting the allocation efficiency of the electronic note identifier.

Therefore, based on the distributed system, all the processing nodes need to be ensured to be available.

As described above, the running data of the processing node includes a load quantity, a memory usage, a CPU usage, a network rate, a packet loss rate, and the like, and the running data may be obtained by monitoring the running status of the processing node in the distributed system by the proxy node. Therefore, whether the processing node in the distributed system runs abnormally may be known in real time. For example, if it is detected that the packet loss rate of the processing node is retained at a high level, it indicates that the processing node may run abnormally; alternatively, if it is detected that the network rate of the processing node is excessively low, the processing node may run abnormally.

When the running status of the processing node changes, corresponding update processing needs to be performed. The update processing includes processing node culling, processing node recovering, and the like.

For example, when an abnormal processing node is detected, the abnormal processing node is culled from the distributed system; alternatively, when it is detected that the abnormal processing node recovers to normal from abnormal, the processing node recovering to normal is deployed back into the distributed system.

In the foregoing process, the reliability of the distributed system is effectively improved, thereby avoiding abnormal interruption of the electronic note identifier allocation service.

In an exemplary embodiment, the method may further include the following step:

performing, by the proxy node, primary-secondary switching processing on a processing node by monitoring a running status of the processing node in the distributed system.

It may be understood that, abnormality of the processing node includes, but is not limited to, an excessively large load quantity, an excessively high memory usage, an excessively high CPU usage, an excessively low network rate, an excessively high packet loss rate, and even the processing node crashing or breaking down.

Based on this, a primary processing node and a secondary processing node are deployed in the distributed system for each processing node.

Therefore, in a process that the processing node performs the electronic note identifier allocation service, when it is detected that the primary processing node runs abnormally according to running data of the primary processing node, the proxy node runs the secondary processing node to control the secondary processing node to perform the electronic note identifier allocation service in place of the primary processing node.

In the foregoing process, a disaster tolerance solution based on the distributed system is implemented. That is, the secondary processing node does not run when the primary processing node runs normally, and only when the primary processing node runs abnormally, the secondary processing node is run to provide the electronic note identifier allocation service to ensure the reliability of the distributed system, thereby avoiding abnormal interruption of the electronic note identifier allocation service and fully ensuring the allocation efficiency of the electronic note identifier.

Figure 14:
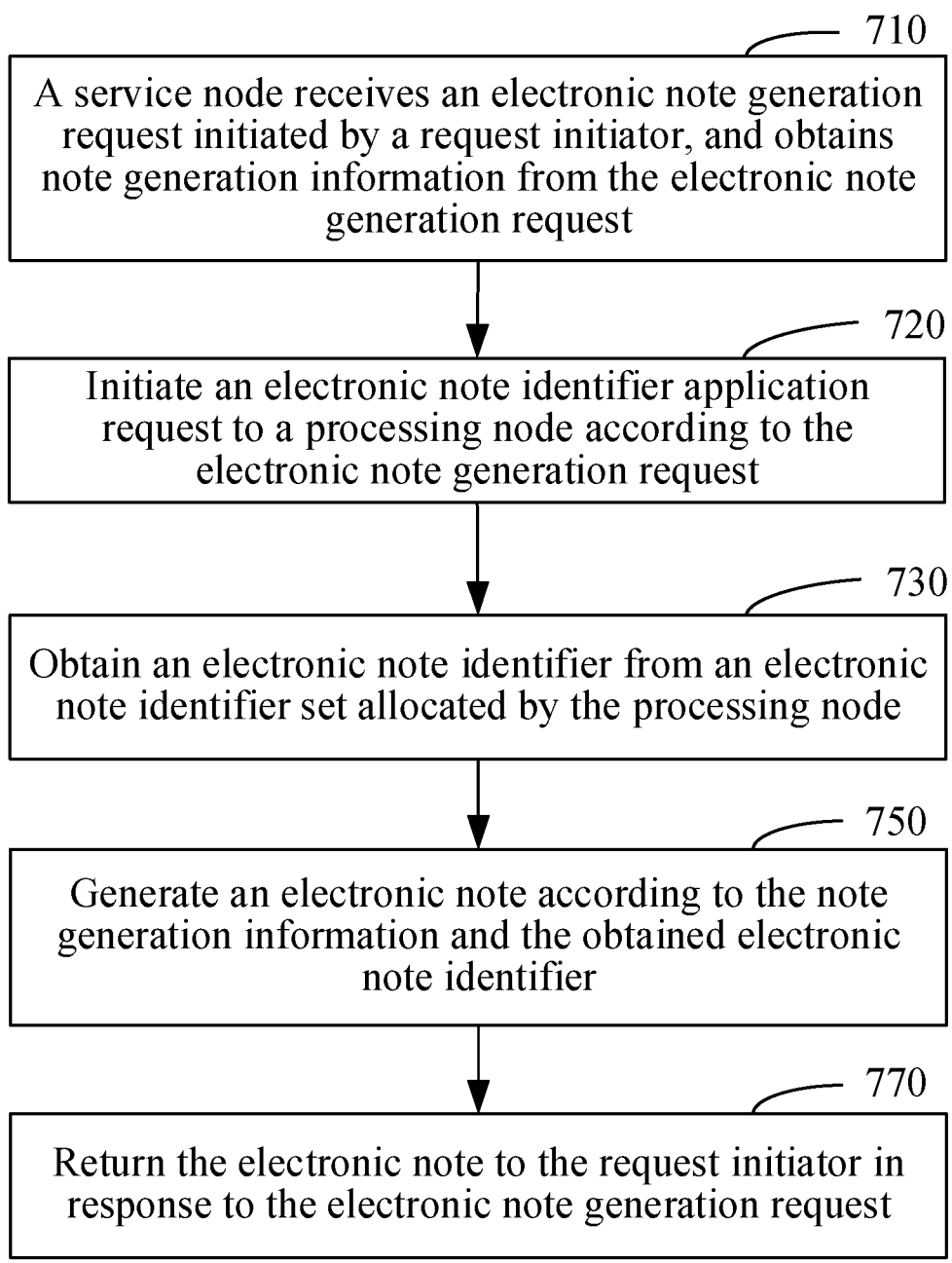
FIG. 14 is a flowchart of an electronic note generation method according to some embodiments.

Referring to FIG. 14, in an exemplary embodiment, an electronic note generation method is provided, applicable to a service node in the implementation shown in FIG. 1. The service node interacts with a distributed system including a processing node, and a structure of the service node may be shown in FIG. 2.

The electronic note generation method may be performed by the service node, and may include the following steps:

Step 710. The service node receives an electronic note generation request initiated by a request initiator, and obtains note generation information from the electronic note generation request.

The electronic note generation request is initiated by a user to the service node by using a client run on the request initiator to request to generate an electronic note.

The client run on the request initiator provides a generation request initiation entrance for the user. When the user expects the service node to perform an electronic note generation service, the user may trigger a relevant operation at the generation request initiation entrance, so that the client detects the operation, and initiates an electronic note generation request to the service node.

For example, the generation request initiation entrance is a virtual button provided by the client, and when the user clicks/taps the virtual button, the client initiates an electronic note generation request to the service node. The click/tap operation is considered as a relevant operation triggered by the user at the generation request initiation entrance.

Then, the service node may receive the electronic note generation request initiated by the user, learn that the user requests to generate an electronic note, and perform the electronic note generation service for the user subsequently.

The electronic note generation request carries note generation information, and the note generation information includes a recipient identifier and a resource transfer amount.

Description is made by using an example in which the electronic note is an electronic invoice. Assuming that a user A purchases commodities of 100 yuan from a merchant B, if the user A requires the merchant B to generate an electronic invoice, the user A initiates an electronic note generation request to the merchant B.

In this case, the electronic note generation request carries note generation information, and the note generation information includes a recipient identifier A and a resource transfer amount 100 yuan.

Step 720. Initiate an electronic note identifier application request to the processing node according to the electronic note generation request.

Step 730. Obtain an electronic note identifier from an electronic note identifier set allocated by the processing node.

The electronic note identifier set is generated by the processing node according to an electronic note issuance quantity and synchronized in the distributed system, and the electronic note identifier includes a note code and a note number. For example, assuming that the electronic note identifier set allocated by the processing node is 14403180911000000001~14403180911100000200, an electronic note identifier, such as 14403180911000000001, may be obtained from the electronic note identifier set for subsequent electronic note generation.

Step 750. Generate an electronic note according to the note generation information and the obtained electronic note identifier.

After the note generation information and the electronic note identifier are obtained, the electronic note may be generated.

Description is made by using an example in which the electronic note is an electronic invoice. As shown in FIG. 15, the electronic invoice includes an invoice title (that is, the recipient identifier), an invoice amount (the resource transfer amount), an invoice generation unit (a service node identifier), an invoice generation time 2018-12-19, an invoice code 14403180911, and an invoice number 000000001.

Step 770. Return the electronic note to the request initiator in response to the electronic note generation request.

In the foregoing process, through the interaction between the service node and the request initiator as well as the processing node in the distributed system, a complete suite of services about an electronic note, that is, the electronic note identifier allocation service and the electronic note generation service, are completed, thereby greatly improving the note generation efficiency.

Figure 16:
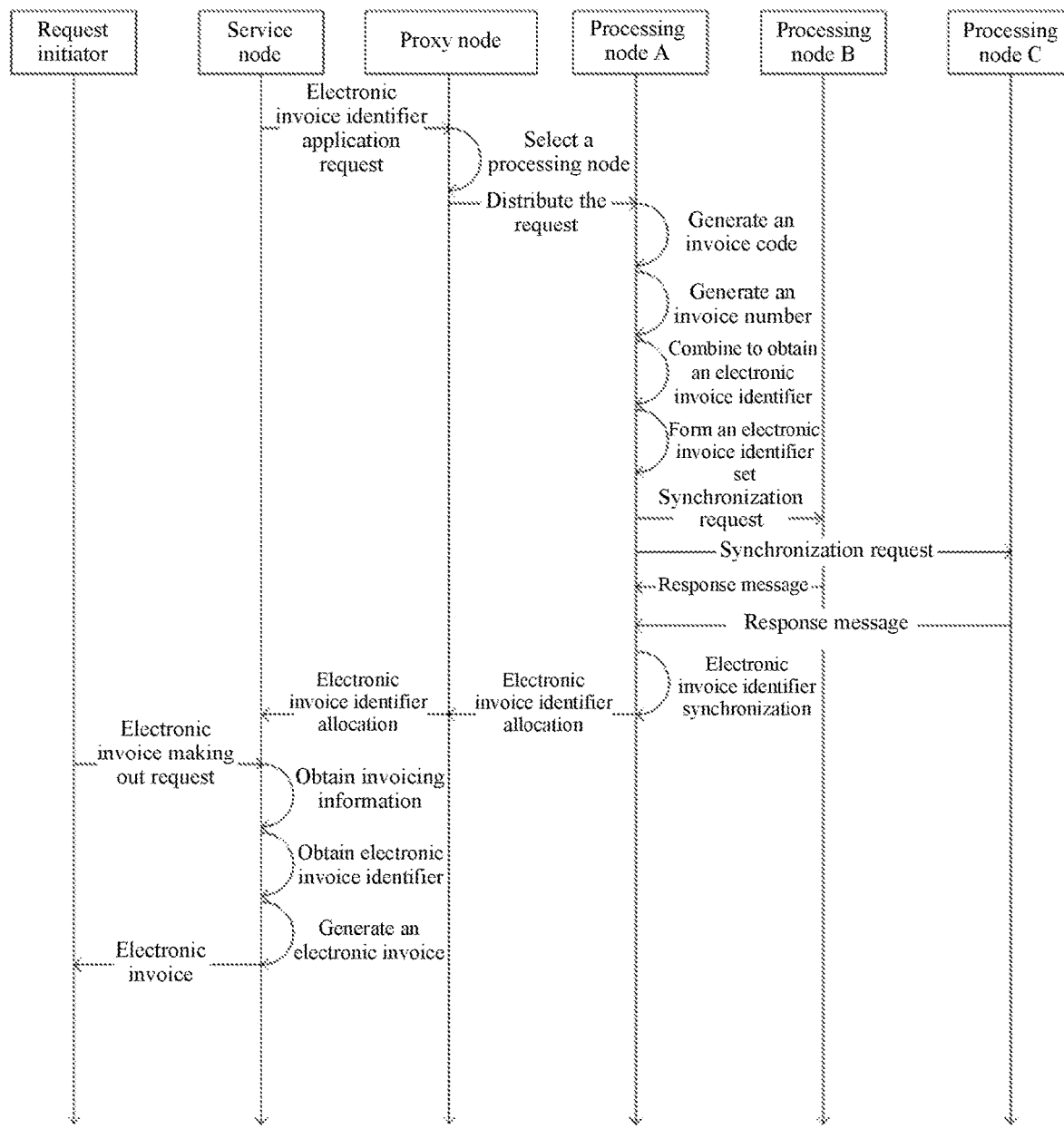
FIG. 16 is a sequence diagram of an electronic invoice reimbursement process in an exemplary application scenario.
Figure 17:
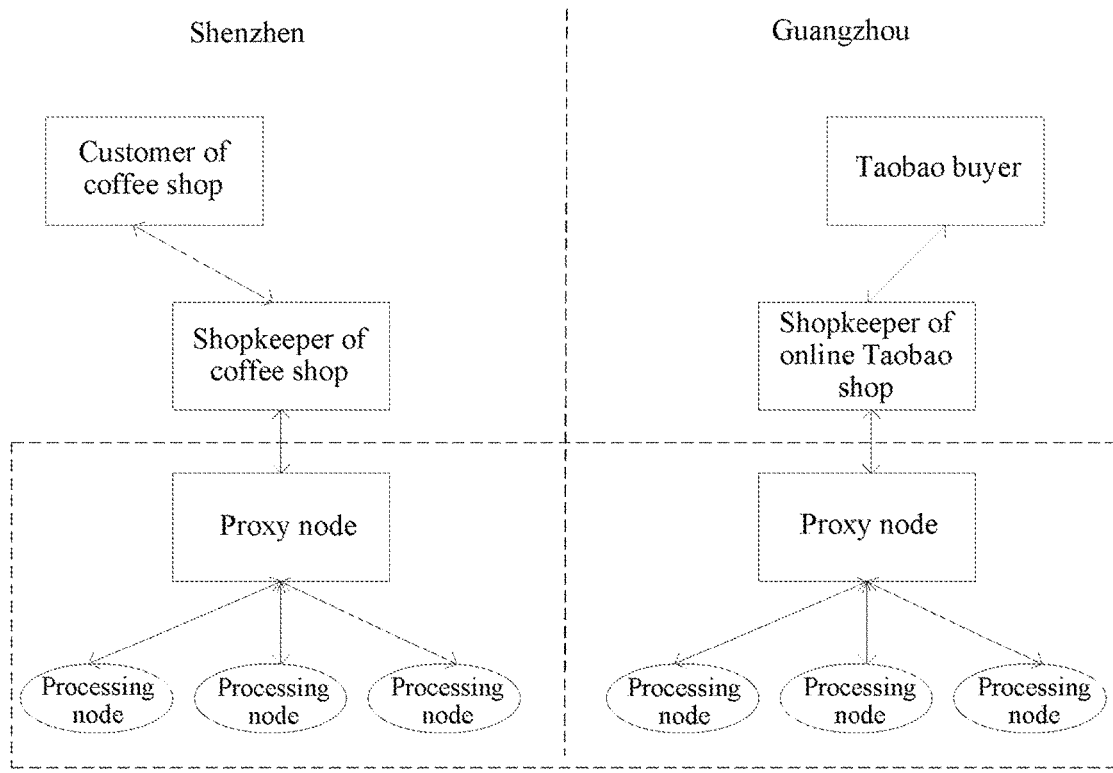
FIG. 17 is a schematic diagram of deploying processing nodes in a distributed system according to a real distribution of merchants in an exemplary application scenario.

FIG. 16 to FIG. 17 are schematic diagrams of a specific implementation of an electronic invoice reimbursement process in an application scenario.

The application scenario includes a request initiator, a service node, and a distributed system. For example, the distributed system may be based on a blockchain network to utilize advantages of the blockchain technology, thereby implementing decentralized tamper-resistant electronic invoice reimbursement system.

The distributed system further includes proxy nodes and processing nodes, and interaction between the parts is shown in FIG. 16.

Further, as shown in FIG. 17, as merchants are allocated at different positions, for example, the merchant may be a shopkeeper of a coffee shop located in Shenzhen, or may be a shopkeeper of an online Taobao shop located in Guangzhou, the proxy nodes and the processing nodes in the distributed system are also correspondingly deployed at different positions.

Certainly, according to operation requirements, the proxy nodes may be deployed following the merchants, that is, deployed in Guangzhou and Shenzhen respectively, or may be deployed together, for example, the proxy nodes are all deployed in Shenzhen. This is not specifically limited in this application scenario.

It is to be understood that the electronic invoice reimbursement process includes an electronic invoice identifier allocation part, an invoice generation part, and a reimbursement part. In this case, in the electronic invoice identifier allocation part, the shopkeeper of the coffee shop in Shenzhen may initiate an electronic invoice identifier application request to the distributed system by using a desktop computer, and a proxy node deployed in Shenzhen selects a processing node for processing the electronic invoice identifier application request initiated by the shopkeeper from a plurality of processing nodes also deployed in Shenzhen, to generate a globally unique electronic invoice identifier in the entire distributed system and returning the electronic invoice identifier to the shopkeeper.

Similarly, the shopkeeper of the online Taobao shop in Guangzhou may initiate an electronic invoice identifier application request to the distributed system by using a smartphone, and a proxy node deployed in Guangzhou selects a processing node for processing the electronic invoice identifier application request initiated by the shopkeeper from a plurality of processing nodes also deployed in Guangzhou, to generate a globally unique electronic invoice identifier in the entire distributed system and return the electronic invoice identifier to the shopkeeper.

The electronic invoice reimbursement process then proceeds from the electronic invoice identifier allocation part to the invoice generation part. In this case, a customer of the coffee shop initiates an electronic invoice generation request to a service node at which the shopkeeper of the coffee shop is located, so that the service node generates an electronic invoice according to invoice generation information in the electronic invoice making invoice request and the electronic invoice identifier allocated by the processing node and returns the electronic invoice to the customer of the coffee shop.

A Taobao buyer may initiate an electronic invoice generation request to a service node at which the shopkeeper of the online Taobao shop is located, so that the service node generates an electronic invoice according to invoice generation information in the electronic invoice generation request and the electronic invoice identifier allocated by the processing node and returns the electronic invoice to the Taobao buyer.

In this case, based on the electronic invoice received by the customer of the coffee shop or the Taobao buyer, the electronic invoice reimbursement process may be triggered to proceed from the invoice generation part to the reimbursement part. When reimbursement processing is performed on the electronic invoice based on the globally unique electronic invoice identifier in the distributed system, it may be unnecessary to worry that the electronic invoice cannot be reimbursed since the electronic invoice identifier of the electronic invoice conflicts with an electronic invoice identifier of an electronic invoice made out by another merchant.

In this application scenario, based on the distributed system, information transmission between the service node and the processing node is maintained consistent, data consistency is achieved between the processing nodes, and the electronic invoice identifier of the electronic invoice conforms to a specific "code+number" note issuance rule, so that the electronic invoice reimbursement service can be performed in such a convenient environment as the distributed system, thereby greatly improving the reimbursement efficiency of the electronic invoice and improving reimbursement experience of users.

The following describes apparatus embodiments of this application, which may be used for performing the electronic note identifier allocation method and the electronic note generation method in this application. For details not disclosed in the apparatus embodiments of this application, refer to the method embodiments of the electronic note identifier allocation method and the electronic note generation method in this application.

Figure 18:
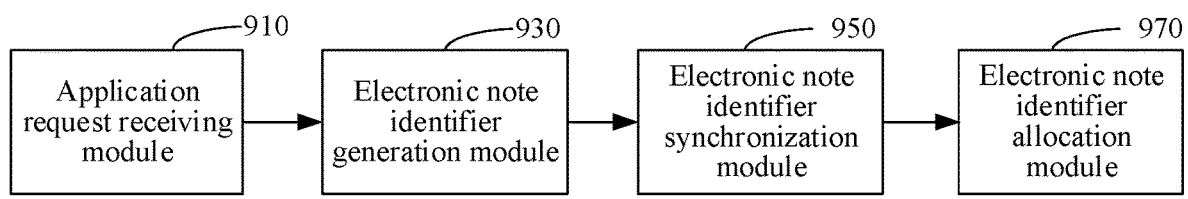
FIG. 18 is a block diagram of an electronic note identifier allocation apparatus according to some embodiments.

Referring to FIG. 18, in an exemplary embodiment, an electronic note identifier allocation apparatus 900 is provided, applicable to a distributed system. The distributed system includes a processing node, and the apparatus 900 is deployed in the processing node in the distributed system.

The apparatus 900 includes, but is not limited to, an application request receiving module 910, an electronic note identifier generation module 930, an electronic note identifier synchronization module 950, and an electronic note identifier allocation module 970.

The application request receiving module 910 is configured for the processing node to receive an electronic note identifier application request initiated by a service node.

The electronic note identifier generation module 930 is configured to generate an electronic note identifier set in response to the electronic note identifier application request, the electronic note identifier set including at least one electronic note identifier, and the electronic note identifier including a note code and a note number.

The electronic note identifier synchronization module 950 is configured to synchronize, in the distributed system, the electronic note identifier in the electronic note identifier set.

The electronic note identifier allocation module 970 is configured to allocate, after the electronic note identifier in the electronic note identifier set is synchronized in the distributed system, the electronic note identifier in the electronic note identifier set to the service node.

In an exemplary embodiment, the electronic note identifier generation module 930 is configured to generate the electronic note identifier set according to an electronic note issuance quantity in response to the electronic note identifier application request.

In an exemplary embodiment, the electronic note identifier generation module 930 includes, but is not limited to: a note code generation unit, a note number generation unit, an electronic note identifier obtaining unit, and an electronic note identifier set generation unit.

The note code generation unit is configured to generate a note code according to a note issuance rule in response to the electronic note identifier application request.

The note number generation unit is configured to obtain at least one note number from a specified note number segment of the processing node based on the electronic note issuance quantity.

The electronic note identifier obtaining unit is configured to obtain, for the note number, an electronic note identifier by using the note code and the note number.

The electronic note identifier set generation unit is configured to generate the electronic note identifier set according to the obtained electronic note identifier.

In an exemplary embodiment, the note code generation unit includes, but is not limited to, an issuance information determining subunit and an issuance information encapsulation subunit.

The issuance information determining subunit is configured to determine, according to the note issuance rule, issuance information required for an electronic note in response to the electronic note identifier application request.

The issuance information encapsulation subunit is configured to encapsulate the issuance information as the note code according to an issuance information encapsulation sequence indicated by the note issuance rule.

In an exemplary embodiment, the note number generation unit includes, but is not limited to, a remaining note number segment determining subunit and a note number selection subunit.

The remaining note number segment determining subunit is configured to determine a remaining note number segment from the specified note number segment of the processing node.

The note number selection subunit is configured to obtain, from the remaining note number segment, a quantity of note numbers matching the electronic note issuance quantity.

In an exemplary embodiment, the remaining note number segment determining subunit includes, but is not limited to, an unused number quantity determining subunit and a first remaining note number segment formation subunit.

The unused number quantity determining subunit is configured to determine a quantity of unused note numbers in the specified note number segment of the processing node.

The first remaining note number segment formation subunit is configured to form the remaining note number segment by using all the unused note numbers in a case that the quantity of the unused note numbers is not less than the electronic note issuance quantity.

In an exemplary embodiment, the note number selection subunit includes, but is not limited to, a first note number definition subunit and a first ascending-order note number obtaining subunit.

The first note number definition subunit is configured to use the smallest note number in the remaining note number segment as the first note number.

The first ascending-order note number obtaining subunit is configured to obtain ascending-order note numbers starting from the first note number until a quantity of the note numbers reaches the electronic note issuance quantity, to obtain the quantity of note numbers matching the electronic note issuance quantity.

In an exemplary embodiment, the remaining note number segment determining subunit further includes, but is not limited to, a first unused note number segment formation subunit, a second unused note number segment formation subunit, and a second remaining note number segment formation subunit.

The first unused note number segment formation subunit is configured to form a first unused note number segment by using all the unused note numbers in a current batch in a case that the quantity of the unused note numbers is less than the electronic note issuance quantity.

The second unused note number segment formation subunit is configured to update a batch in the note code, and form a second unused note number segment by using all unused note numbers in an updated batch.

The second remaining note number segment formation subunit is configured to obtain the remaining note number segment according to the first unused note number segment and the second unused note number segment.

In an exemplary embodiment, the note number selection subunit includes, but is not limited to, a second note number definition subunit, a second ascending-order note number obtaining subunit, and a third ascending-order note number obtaining subunit.

The second note number definition subunit is configured to use the smallest note number in the first unused note number segment as the first note number.

The second ascending-order note number obtaining subunit is configured to obtain ascending-order note numbers starting from the first note number until a quantity of the note numbers reaches a quantity of unused note numbers in the first unused note number segment.

The third ascending-order note number obtaining subunit is configured to obtain ascending-order note numbers starting from the smallest note number in the second unused note number segment until a quantity of the note numbers reaches the electronic note issuance quantity, to obtain the quantity of note numbers matching the electronic note issuance quantity.

In an exemplary embodiment, the electronic note identifier synchronization module 950 includes, but is not limited to, a synchronization request initiation unit, a response message receiving unit, and an electronic note identifier sending unit.

The synchronization request initiation unit is configured to initiate, for each electronic note identifier in the electronic note identifier set, a synchronization request to another processing node in the distributed system, so that the another processing node in the distributed system generates a response message for the electronic note identifier in response to the synchronization request.

The response message receiving unit is configured to receive the response message for the electronic note identifier reported by the another processing node in the distributed system.

The electronic note identifier sending unit is configured to determine, in a case that a quantity of response messages for the electronic note identifier is not less than a specified threshold, that the electronic note identifier is synchronized in the distributed system, and send the synchronized electronic note identifier to the another processing node in the distributed system.

In an exemplary embodiment, the distributed system further includes a proxy node.

Correspondingly, the apparatus 900 further includes, but is not limited to, a processing node selection module and a request distribution module.

The processing node selection module is configured for the proxy node to select a processing node for receiving the electronic note identifier application request from the processing nodes included in the distributed system.

The request distribution module is configured to distribute the electronic note identifier application request to the selected processing node.

In an exemplary embodiment, the processing node selection module includes, but is not limited to, a running data obtaining unit, a physical distance determining unit, and a processing node screening unit.

The running data obtaining unit is configured for the proxy node to obtain running data of the processing nodes in the distributed system by monitoring running statuses of the processing nodes in the distributed system.

The physical distance determining unit is configured to determine physical distances between the service node and the processing nodes in the distributed system.

The processing node screening unit is configured to screen the processing nodes in the distributed system according to the running data and the physical distances to obtain the processing node for receiving the electronic note identifier application request.

Figure 19:
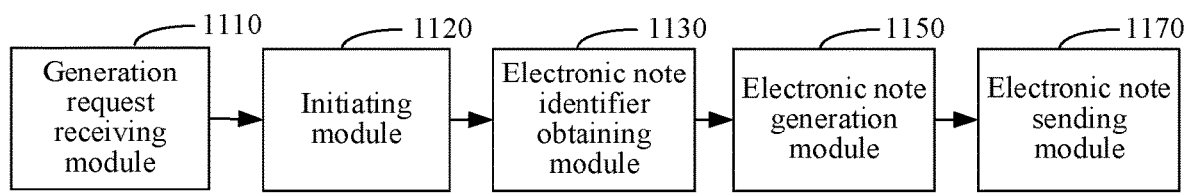
FIG. 19 is a block diagram of an electronic note generation apparatus according to some embodiments.

Referring to FIG. 19, in an exemplary embodiment, an electronic note generation apparatus 1100 is provided, the apparatus 1100 is deployed in a service node, the service node interacts with a distributed system, and the distributed system includes a processing node.

The apparatus 1100 includes, but is not limited to, a generation request receiving module 1110, an initiating module 1120, an electronic note identifier obtaining module 1130, an electronic note generation module 1150, and an electronic note sending module 1170.

The generation request receiving module 1110 is configured for the service node to receive an electronic note generation request initiated by a request initiator, and obtain note generation information from the electronic note generation request, the note generation information including a recipient identifier and a resource transfer amount.

The initiating module 1120 is configured to initiate an electronic note identifier application request to the processing node according to the electronic note generation request.

The electronic note identifier obtaining module 1130 is configured to obtain an electronic note identifier from an electronic note identifier set allocated by the processing node, the electronic note identifier set being generated by the processing node and synchronized in the distributed system, and the electronic note identifier including a note code and a note number.

The electronic note generation module 1150 is configured to generate an electronic note according to the note generation information and the obtained electronic note identifier.

The electronic note sending module 1170 is configured to return the electronic note to the request initiator in response to the electronic note generation request.

In an exemplary embodiment, an electronic note generation system is provided. The system includes a request initiator, a service node, and a processing node in a distributed system.

The service node initiates an electronic note identifier application request to the processing node.

The processing node generates an electronic note identifier set according to an electronic note issuance quantity in response to the electronic note identifier application request and synchronizes the electronic note identifier set in the distributed system, to allocate an electronic note identifier in the electronic note identifier set to the service node, the electronic note identifier including a note code and a note number.

The request initiator initiates an electronic note generation request to the service node, the electronic note generation request carrying note generation information, and the note generation information including a recipient identifier and a resource transfer amount.

The service node obtains the electronic note identifier from the electronic note identifier set in response to the electronic note generation request, to generate an electronic note according to the note generation information and the obtained electronic note identifier and return the electronic note to the request initiator.

When the apparatuses provided in the foregoing embodiments perform electronic note-related processing, only division of the foregoing functional modules are described by using an example. During actual application, the foregoing functions may be allocated to and completed by different functional modules according to requirements, that is, the internal structures of the apparatuses are divided into different functional modules, to complete all or some of the foregoing described functions.

In addition, the apparatuses provided in the foregoing embodiments and the method embodiments belong to the same idea. Specific operation manners of the modules have been described in detail in the method embodiments. Details are not described herein again.

Figure 20:
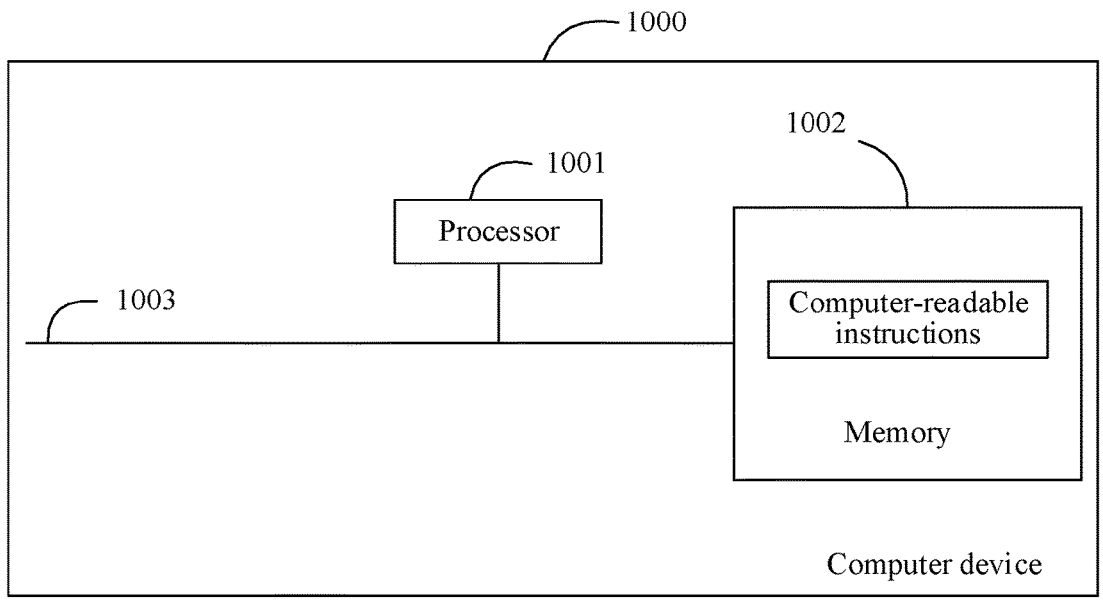
FIG. 20 is a block diagram of a computer device according some embodiments.

Referring to FIG. 20, in an exemplary embodiment, a computer device 1000 is provided, including at least one processor 1001, at least one memory 1002, and at least one communication bus 1003.

The memory 1002 stores computer-readable instructions, and the processor 1001 reads, by using the communication bus 1003, the computer-readable instructions stored in the memory 1002.

The computer-readable instructions, when executed by the processor 1001, implement the electronic note identifier allocation method or the electronic note generation method in the foregoing embodiments.

In an exemplary embodiment, a storage medium (e.g., non-transitory computer readable storage medium) is provided, storing a computer program, the computer program, when executed by a processor, implementing the electronic note identifier allocation method or the electronic note generation method in the foregoing embodiments.

In an exemplary embodiment, an embodiment of this application further provides a computer program product including instructions, the instructions, when run on a server, causing the server to perform the electronic note identifier allocation method or the electronic note generation method in the foregoing embodiments.

The foregoing descriptions are merely exemplary embodiments of this application, and are not intended to limit the implementations of this application. A person of ordinary skill in the art may conveniently make variations or modifications according to the main idea and spirit of this application. Therefore, the protection scope of this application shall be subject to the protection scope of the claims.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs electronic node identifier allocation and/or electronic note generation. In practical application, the foregoing functions may be allocated to and completed by different functional modules according to requirements, that is, an inner structure of a device is divided into different functional modules to implement all or a part of the functions described above.

What is claimed is:

1. An electronic note identifier allocation method performed by a processing node of a distributed computer system, the distributed computer system including a plurality of processing nodes, including the processing node, one or more processors, and memory storing instructions for execution by the one or more processors, the method comprising:

receiving, by the processing node, an electronic note identifier application request initiated by a service node;

generating an electronic note identifier set according to an electronic note issuance quantity in response to the electronic note identifier application request, the electronic note identifier set comprising at least one electronic note identifier, and the at least one electronic note identifier includes a note code and a note number, the generating further including:

generating a note code according to a note issuance rule in response to the electronic note identifier application request;

obtaining one or more note numbers from a specified note number segment of the processing node based on the electronic note issuance quantity;

obtaining, for each of the one or more note numbers, a respective electronic note identifier by using the note code and the note number; and generating the electronic note identifier set according to the obtained respective electronic note identifier;

synchronizing, in the distributed computer system, the at least one electronic note identifier in the electronic note identifier set; and after the synchronizing, allocating the at least one electronic note identifier in the electronic note identifier set to the service node.

2. The method according to claim 1, wherein generating the note code according to the note issuance rule further comprises:

determining, according to the note issuance rule, issuance information required for an electronic note in response to the electronic note identifier application request; and encapsulating the issuance information as the note code according to an issuance information encapsulation sequence indicated by the note issuance rule.

3. The method according to claim 1, wherein obtaining the one or more note numbers from the specified note number segment of the processing node based on the electronic note issuance quantity comprises:
   determining a remaining note number segment from the specified note number segment of the processing node; and
   obtaining, from the remaining note number segment, a quantity of note numbers matching the electronic note issuance quantity.

4. The method according to claim 3, wherein the determining a remaining note number segment from the specified note number segment of the processing node comprises:
   determining a quantity of unused note numbers in the specified note number segment of the processing node; and
   forming the remaining note number segment by using all the unused note numbers when the quantity of the unused note numbers is not less than the electronic note issuance quantity.

5. The method according to claim 3, wherein the obtaining, from the remaining note number segment, a quantity of note numbers matching the electronic note issuance quantity comprises:
   using the smallest note number in the remaining note number segment as the first note number; and
   obtaining ascending-order note numbers starting from the first note number until a quantity of the note numbers reaches the electronic note issuance quantity, to obtain the quantity of note numbers matching the electronic note issuance quantity.

6. A distributed computer system for allocating electronic note identifiers, comprising:
   a plurality of processing nodes, including a processing node, the processing node having one or more processors and memory storing instructions that, when executed by the one or more processors, cause the processing node to perform operations comprising:
      receiving, by the processing node, an electronic note identifier application request initiated by a service node;
      generating an electronic note identifier set according to an electronic note issuance quantity in response to the electronic note identifier application request, the electronic note identifier set comprising at least one electronic note identifier, and the at least one electronic note identifier includes a note code and a note number, the generating further including:
         generating a note code according to a note issuance rule in response to the electronic note identifier application request;
         obtaining one or more note numbers from a specified note number segment of the processing node based on the electronic note issuance quantity;
         obtaining, for each of the one or more note numbers, a respective electronic note identifier by using the note code and the note number; and
         generating the electronic note identifier set according to the obtained respective electronic note identifier;
      synchronizing, in the distributed computer system, the at least one electronic note identifier in the electronic note identifier set; and
      after the synchronizing, allocating the at least one electronic note identifier in the electronic note identifier set to the service node.

7. The distributed computer system according to claim 6, wherein generating the note code according to the note issuance rule further comprises:
   determining, according to the note issuance rule, issuance information required for an electronic note in response to the electronic note identifier application request; and
   encapsulating the issuance information as the note code according to an issuance information encapsulation sequence indicated by the note issuance rule.

8. The distributed computer system according to claim 6, wherein obtaining the one or more note numbers from the specified note number segment of the processing node based on the electronic note issuance quantity comprises:
   determining a remaining note number segment from the specified note number segment of the processing node; and
   obtaining, from the remaining note number segment, a quantity of note numbers matching the electronic note issuance quantity.

9. The distributed computer system according to claim 8, wherein the determining a remaining note number segment from the specified note number segment of the processing node comprises:
   determining a quantity of unused note numbers in the specified note number segment of the processing node; and
   forming the remaining note number segment by using all the unused note numbers when that the quantity of the unused note numbers is not less than the electronic note issuance quantity.

10. The distributed computer system according to claim 8, wherein the obtaining, from the remaining note number segment, a quantity of note numbers matching the electronic note issuance quantity comprises:
    using the smallest note number in the remaining note number segment as the first note number; and
    obtaining ascending-order note numbers starting from the first note number until a quantity of the note numbers reaches the electronic note issuance quantity, to obtain the quantity of note numbers matching the electronic note issuance quantity.

11. A non-transitory computer readable storage medium storing computer-readable instructions that, when executed by one or more processors of a distributed computer system having a plurality of processing nodes, cause the distributed computer system to perform operations comprising:
    receiving, by a processing node of the plurality of processing nodes, an electronic note identifier application request initiated by a service node;
    generating an electronic note identifier set according to an electronic note issuance quantity in response to the electronic note identifier application request, the electronic note identifier set comprising at least one electronic note identifier, and the at least one electronic note identifier includes a note code and a note number, the generating further including:
       generating a note code according to a note issuance rule in response to the electronic note identifier application request;
       obtaining one or more note numbers from a specified note number segment of the processing node based on the electronic note issuance quantity;

obtaining, for each of the one or more note numbers, a respective electronic note identifier by using the note code and the note number; and generating the electronic note identifier set according to the obtained respective electronic note identifier;

synchronizing, in the distributed computer system, the at least one electronic note identifier in the electronic note identifier set; and after the synchronizing, allocating the at least one electronic note identifier in the electronic note identifier set to the service node.

12. The non-transitory computer readable storage medium according to claim 11, wherein generating the note code according to the note issuance rule further comprises:

determining, according to the note issuance rule, issuance information required for an electronic note in response to the electronic note identifier application request; and encapsulating the issuance information as the note code according to an issuance information encapsulation sequence indicated by the note issuance rule.

13. The non-transitory computer readable storage medium according to claim 11, wherein obtaining the one or more note numbers from the specified note number segment of the processing node based on the electronic note issuance quantity comprises:

determining a remaining note number segment from the specified note number segment of the processing node; and obtaining, from the remaining note number segment, a quantity of note numbers matching the electronic note issuance quantity.

14. The non-transitory computer readable storage medium according to claim 13, wherein the determining a remaining note number segment from the specified note number segment of the processing node comprises:

determining a quantity of unused note numbers in the specified note number segment of the processing node; and forming the remaining note number segment by using all the unused note numbers when the quantity of the unused note numbers is not less than the electronic note issuance quantity.

\* \* \* \* \*